(12) United States Patent
Long et al.

(10) Patent No.: US 11,391,569 B2
(45) Date of Patent: Jul. 19, 2022

(54) METHOD AND DEVICE FOR MONITORING WATER VOLUME CHANGE, COMPUTER DEVICE AND STORAGE MEDIUM

(71) Applicant: Tsinghua University, Beijing (CN)

(72) Inventors: Di Long, Beijing (CN); Xing-Dong Li, Beijing (CN); Qi Huang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 386 days.

(21) Appl. No.: 16/676,454

(22) Filed: Nov. 7, 2019

(65) Prior Publication Data

US 2020/0149888 A1 May 14, 2020

(30) Foreign Application Priority Data

Nov. 8, 2018 (CN) .......................... 201811327253.4

(51) Int. Cl.
*G01C 13/00* (2006.01)
*G01S 13/88* (2006.01)
*G06T 7/55* (2017.01)

(52) U.S. Cl.
CPC .......... *G01C 13/008* (2013.01); *G01S 13/882* (2013.01); *G06T 7/55* (2017.01)

(58) Field of Classification Search
CPC .... G01C 13/006; G01C 13/004; G01C 13/00; G01C 13/002; G01C 13/008; G01C 5/06;
(Continued)

(56) References Cited

U.S. PATENT DOCUMENTS 4,502,816 A * 3/1985 Creter, Jr. ................ E02B 3/06
405/30
2007/0050141 A1* 3/2007 Posey ...................... G01W 1/10
702/3

(Continued)

FOREIGN PATENT DOCUMENTS

CN         103363962         10/2013
CN         104482989         4/2015
(Continued)

OTHER PUBLICATIONS

Tang G Q, Long D, Wan W, et al. An overview and outlook of global water remote sensing technology and applications (in Chinese). Sci Sin Tech, 2015, 45: 1013-1023, doi: 10.1360/N092015-00024.

*Primary Examiner* — Andre J Allen

(57) ABSTRACT

The present disclosure relates to a method and a device for monitoring the water volume change, and a computer device and a storage medium. The method includes: acquiring a lake shoreline change sequence, a lake area change sequence, and a combined altimetry water level sequence; obtaining a lake water level sequence based on the combined altimetry water level sequence and the lake shoreline change sequence; calculating a first regressive relationship between the lake water volume and the lake water level based on the lake area change sequence and the lake water level sequence; and obtaining a lake water volume change sequence based on the lake water level sequence and the first regressive relationship between the lake water volume and the lake water level.

18 Claims, 12 Drawing Sheets

(58) Field of Classification Search
CPC ........ G01C 17/34; G01C 21/16; G01C 25/00; G01C 5/04; G01C 9/00; G01C 9/06; G01C 9/14; G01C 9/18; G01C 9/12
USPC .......................................... 73/170.26–170.34
See application file for complete search history.

(56) References Cited

U.S. PATENT DOCUMENTS

| | | | |
|---|---|---|---|
| 2007/0050142 A1* | 3/2007 | Posey | ..................... G01W 1/00 702/3 |
| 2015/0278627 A1* | 10/2015 | Boriah | ................. G06V 10/147 382/180 |
| 2018/0252694 A1* | 9/2018 | Mase | ..................... G08B 31/00 |

FOREIGN PATENT DOCUMENTS

| | | | | |
|---|---|---|---|---|
| CN | 104613943 | | 5/2015 | |
| CN | 109653157 A | * | 4/2019 | |
| CN | 111504424 A | * | 8/2020 | ......... G01S 13/9027 |
| CN | 113449960 A | * | 9/2021 | |
| JP | 2001101282 A | * | 4/2001 | |
| JP | 2004117119 A | * | 4/2004 | |
| WO | WO-2004076972 A1 | * | 9/2004 | ............. G01S 17/88 |

\* cited by examiner

METHOD AND DEVICE FOR MONITORING WATER VOLUME CHANGE, COMPUTER DEVICE AND STORAGE MEDIUM

CROSS-REFERENCE TO RELATED APPLICATION

This application claims all benefits accruing under 35 U.S.C. § 119 from China Patent Application No. 201811327253.4, filed on Nov. 8, 2018 in the China National Intellectual Property Administration, the content of which is hereby incorporated by reference.

TECHNICAL FIELD

The present application relates to the technical field of lake water volume monitoring, in particular to a method and a device for monitoring water volume change, a computer device and a storage medium.

BACKGROUND

Along with the development of remote sensing technology and satellite altimetry technology, the remote sensing and monitoring technology of lake water volume change is also continuously improved. The lake has ecological benefits and economic benefits such as flood control, climate regulation, irrigation, tourism and the like. The water volume change of the lake, if not affected by human activities, can reflect the response of the hydrological process of the area to climate changes, serving as basic data for climate change research. In recent years, the Qinghai-Tibet Plateau has seen rapid expansion of lake areas and volumes. Some basic facilities close to lake banks, such as highways, power transmission lines and the like, have been confronted with risks of being submerged, and therefore it is necessary to provide a method for monitoring water volume change.

Traditionally, lake water volume change is mainly monitored by remote sensing technology, such as lake area remote sensing inversion and lake water level remote sensing inversion. The lake area remote sensing inversion is based on optical or synthetic-aperture radar (SAR) remotely sensed images with medium or high resolutions, obtained by satellites such as Landsat, Sentinel, Gaofen (Chinese high resolution satellite), China-brazil earth resource satellite, HJ-1 (Chinese environmental satellite) and the like. The lake area can be extracted by manually identifying the lake boundary, or be automatically extracted by setting a threshold value of the image binarized with water indices. When the data volume is large, the latter method is more efficient, although random errors may exist. The remote sensing inversion of the lake water level is mainly based on the satellite altimetry technology. The basic principle of the satellite altimetry is described as follows. An electromagnetic pulse signal (e.g., microwave or laser) is emitted by a radar or lidar on the satellite. A distance between the satellite and the reflection surface is determined by measuring the satellite-to-surface round-trip time of the electromagnetic pulse. An ellipsoid height of the reflection surface relative to a reference ellipsoid is calculated according to the height of the satellite orbit relative to the reference ellipsoid and the distance between the satellite and the reflection surface. The height of the reflection surface relative to the geoid is calculated by subtracting a geodetic height from the ellipsoid height. The commonly used altimetry satellites include: ERS, Envisat, TOPEX, Jason, ICESat, CryoSat-2 and the like, where the ICESat is a laser satellite.

SUMMARY

What is needed therefore is to provide a method and a device for monitoring water volume change, a computer device and a storage medium.

A method for monitoring the water volume change includes:

acquiring a lake shoreline change sequence, a lake area change sequence, and a combined altimetry water level sequence;

obtaining a lake water level sequence based on the combined altimetry water level sequence and the lake shoreline change sequence;

calculating a first regressive relationship between the lake water volume and the lake water level based on the lake area change sequence and the lake water level sequence; and obtaining a lake water volume change sequence based on the lake water level sequence and the first regressive relationship between the lake water volume and the lake water level.

In an embodiment, the obtaining the lake water level sequence based on the combined altimetry water level sequence and the lake shoreline change sequence includes:

matching the combined altimetry water level sequence with the lake shoreline change sequence, through linear regression analysis, to obtain a regression coefficient and a determination coefficient, a time interval between the matched combined altimetry water level sequence and the matched lake shoreline change sequence being within a preset time interval value;

calculating the optical water level sequence from the lake shoreline change sequence based on the regression coefficient and the determination coefficient; and obtaining the lake water level sequence based on the optical water level sequence and the combined altimetry water level sequence.

In an embodiment, the calculating a first regressive relationship between the lake water volume and the lake water level based on the lake area change sequence and the lake water level sequence includes:

obtaining a quadratic fitting function fitting the lake area change sequence and the lake water level sequence, to obtain the second regressive relationship between the lake area and the lake water level; and obtaining the first regressive relationship between the lake water volume and the lake water level based on the second regressive relationship between the lake area and the lake water level and through an integral operation.

In an embodiment, the method for monitoring the water volume change further includes:

receiving altimetry water level sequences from different sources;

judging whether an overlapped time period between the altimetry water level sequences from different sources is greater than a first preset value or not;

if the overlapped period between the altimetry water level sequences from different sources is larger than the first preset value, updating the altimetry water level sequences from corresponding sources by removing different system deviations, and combining the updated altimetry water level sequences, to obtain different intermediate altimetry water level sequences; respectively calculating smoothness values of the intermediate altimetry water level sequences; selecting an optimal smoothness value from the smoothness values of the intermediate altimetry water level sequences; and regarding the intermediate altimetry water level sequence having the optimal smoothness value as the combined altimetry water level sequence; and if the overlapped period between the altimetry water level sequences from different sources is less than or equal to the first preset value, combining the altimetry water level sequences from corresponding sources by removing different system deviations, to obtain different intermediate altimetry water level sequences; obtaining a linear fitting function fitting each of the intermediate altimetry water level sequences and the lake shoreline change sequence, through linear regression analysis, to obtain a determination coefficient corresponding to each of the intermediate altimetry water level sequences; and regarding the intermediate altimetry water level sequence with a largest determination coefficient as the combined altimetry water level sequence.

In an embodiment, the respectively calculating smoothness values of the intermediate altimetry water level sequences, selecting the optimal smoothness value from the smoothness values of the intermediate altimetry water level sequences, and regarding the intermediate altimetry water level sequence having the optimal smoothness value as the combined altimetry water level sequence, include:

acquiring the smoothness value of each of the intermediate altimetry water level sequences;

sorting the smoothness values of the intermediate altimetry water level sequences by value, and regarding a minimum smoothness value as the optimal smoothness value; and regarding the intermediate altimetry water level sequence having the minimum smoothness value as the combined altimetry water level sequence.

In an embodiment, the acquiring the smoothness value of each of the intermediate altimetry water level sequences includes:

acquiring an acquisition time of each altimetry water level in each intermediate altimetry water level sequence;

obtaining a weight of a current altimetry water level based on an acquisition time the current altimetry water level and a next acquisition time of a next altimetry water level sampled at the next acquisition time;

acquiring a water level difference between the current altimetry water level and the next altimetry water level; and obtaining the smoothness value of each intermediate altimetry water level sequence based on the weight and the water level difference corresponding to each altimetry water level in the intermediate altimetry water level sequence.

In an embodiment, the method for monitoring the water volume change further includes:

receiving altimetry waveforms from each source;

selecting altimetry waveforms located in a lake area from the received altimetry waveforms in a same cycle of each source;

retracking the selected altimetry waveforms through an improved threshold retracker (ITR) algorithm, to obtain one or more altimetry water levels corresponding to an altimetry waveform;

screening the altimetry water levels of all altimetry waveforms in the same cycle of each source through a clustering algorithm, to obtain one altimetry water level; and obtaining a plurality of altimetry water levels in a plurality of cycles to form the altimetry water level sequence of each source.

In an embodiment, the retracking the altimetry waveforms through the improved threshold retracker algorithm, to obtain one or more altimetry water levels corresponding to the same altimetry waveform includes:

separating each altimetry waveform into sub-waveforms by identifying a suddenly-changed position of an echo power in the waveform, to obtain the sub-waveforms and a number thereof; and calculating a correction for each sub-waveform through the ITR algorithm, and correcting the waveform according to the correction, to obtain one or more altimetry water levels corresponding to the same altimetry waveform.

In an embodiment, the separating each altimetry waveform into sub-waveforms by identifying the suddenly-changed position of the echo power in the waveform, to obtain the sub-waveforms and the number thereof includes:

obtaining a plurality of first echo power differences, a plurality of second echo power differences, a first mean square error, a second mean square error, and a first reference value;

among the second echo power differences corresponding to all sampling points of the altimetry waveform, if the second echo power differences in a continuous sub-sequence of the altimetry waveform are all greater than the first reference value, and a quantity of the second echo power differences in the continuous sub-sequence is equal to or larger than a first preset number, regarding echo powers of the continuous sub-sequence as a sub-sequence, and recording a position of a potential sub-waveform by recording an initial sequence number of the echo power and a length of the continuous sub-sequence;

if, in each sub-sequence, the number of the sampling points having the first echo power difference less than or equal to the first mean square error is larger than or equal to a second preset number, determining that the sub-sequence is not a confirmed sub-waveform; and if, in each sub-sequence, the number of the sampling points having the first echo power difference less than or equal to the first mean square error is less than the second preset number, determining that the sub-sequence is a confirmed sub-waveform.

In an embodiment, the obtaining the plurality of first echo power differences, the plurality of second echo power differences, the first mean square error, the second mean square error, and the first reference value includes:

acquiring echo powers of continuous three sampling points which are a current sampling point i, a next sampling point i+1 after the current sampling point, and a third sampling point i+2 directly after the next sampling point;

obtaining the first echo power difference $D1_i$ between the echo power $P_i$ of the current sampling point i and the echo power $P_{i+1}$ corresponding to the next sampling point i+1;

obtaining the second echo power difference $D2_i$ between the echo power $P_i$ of the current sampling point i and the echo power $P_{i+2}$ of the third sampling point;

obtaining the first mean square error S1 based on the first echo power differences D1 corresponding to all sampling points;

obtaining the second mean square error S2 based on the second echo power differences D2 corresponding to all sampling points; and calculating the first reference value based on a first preset multiplier and the second mean square error.

In an embodiment, the calculating the correction for each sub-waveform through the ITR algorithm, and correcting the waveform according to the correction, to obtain one or more altimetry water levels corresponding to the same altimetry waveform, include:

calculating a waveform amplitude of each sub-waveform;

calculating an average value of the echo powers of a first N sampling points corresponding to each sub-waveform;

taking a half of a sum of the waveform amplitude of the sub-waveform and the average value of the echo powers of the first N sampling points corresponding to the sub-waveform as a threshold value, determining a midpoint of a leading edge of each sub-waveform through a linear interpolation method, and calculating the correction corresponding to the sub-waveform; and correcting each altimetry waveform according to the correction, to obtain one or more altimetry water levels corresponding to one altimetry waveform in each cycle.

In an embodiment, the screening the altimetry water levels of all altimetry waveforms in the same cycle of each source through the clustering algorithm, to obtain one altimetry water level includes:

dividing a water level distribution scope of the altimetry water levels of the altimetry waveforms in each cycle into a plurality of equal water level ranges; and counting a number of the altimetry water levels in each water level range; selecting a water level range with a largest aggregation degree of the altimetry water levels; averaging the altimetry water levels in the water level range with the largest aggregation degree to acquire a clustering center, and the clustering center being an altimetry water level corresponding to one cycle.

In an embodiment, the method for monitoring the water volume change further includes:

judging whether a number of the altimetry water levels in the water level range with the largest aggregation degree in one cycle is greater than or equal to a second preset value;

if the number of the altimetry water levels in the water level range with the largest aggregation degree in one cycle is larger than or equal to the second preset value, determining a quality rank of the clustering center to be a first rank;

if the number of the altimetry water levels in the water level range with the largest aggregation degree in one cycle is less than the second preset value, judging whether the number of the altimetry water levels in the water level range with the largest aggregation degree in one cycle is greater than or equal to a third preset value;

if the number of the altimetry water levels in the water level range with the largest aggregation degree in one cycle is less than the second preset value, and greater than or equal to the third preset value, determining the quality rank of the clustering center to be a second rank; and if the number of the altimetry water levels in the water level range with the largest aggregation degree in one cycle is less than the third preset value, determining the quality rank of the clustering center to be a third rank;

wherein the second preset value is greater than the third preset value.

In an embodiment, the method for monitoring the water volume change further includes when an altimetry water level is in a water level range having a clustering center in the third quality rank, and a difference between the altimetry water level and an adjacent altimetry water level thereof is larger than or equal to a preset threshold value, the altimetry water level is excluded.

In an embodiment, the method for monitoring the water volume change further includes receiving remotely sensed images;

receiving an area selection command for selecting a research area;

selecting different water body indexes for remotely sensed images in different time periods, and extracting water body images based on water body indexes; and selecting a threshold value satisfying a maximum inter-class variance through a Maximal Inter-Class Variance Algorithm, binarizing each of the extracted water body images, and counting a number of target pixels, to obtain a water body area, which is used for characterizing the lake shoreline change sequence and the lake area change sequence.

In an embodiment, the selecting different water body indexes for the remotely sensed images in different time periods, and the extracting water body images based on the water body indexes include:

judging whether a remotely sensed image is an image of a snow period;

if the remotely sensed image is the image of the snow period, selecting a normalized difference water index to extract a water body image; and if the remotely sensed image is not the image of the snow period, selecting a modified normalized difference water index to extract a water body image.

The present application further provides a device for monitoring a water volume change, including:

an acquiring module, configured to acquire a lake shoreline change sequence, a lake area change sequence, and a combined altimetry water level sequence;

a lake water level acquiring module, configured to obtain a lake water level sequence based on the combined altimetry water level sequence and the lake shoreline change sequence;

a relation acquiring module for lake water volume and lake water level, configured to calculate a first regressive relationship between the lake water volume and the lake water level based on the lake area change sequence and the lake water level sequence; and a water volume change acquiring module, configured to obtain a lake water volume change sequence based on the lake water level sequence and the first regressive relationship between the lake water volume and the lake water level.

The present application further provides a computer device, including a memory, a processor, and computer programs stored in the memory and executable by the processor; by executing the computer programs, the processor being capable of performing the method above.

The present application further provides a computer readable storage medium, having computer programs stored thereon, by executing the computer programs, a processor being capable of performing the method above.

In the method and the device for monitoring the water volume change, the computer device, and the computer readable storage medium above, the lake shoreline change sequence, the lake area change sequence, and the combined altimetry water level sequence are acquired; then the lake water level sequence is obtained based on the combined altimetry water level sequence and the lake shoreline change sequence; the first regressive relationship between the lake water volume and the lake water level is calculated based on the lake area change sequence and the lake water level sequence; finally the lake water volume change sequence is obtained based on the lake water level sequence and the first regressive relationship between the lake water volume and the lake water level, thereby realizing a remote monitoring for the lake water volume. In this application, the lake shoreline change sequence and the lake area change sequence are extracted automatically through algorithms, so that the lake water volume and the water level are obtained, and the lake water volume is obtained based on the lake water level sequence. The method and the device for monitoring the water volume change of the present application can realize remote sensing and monitoring the lake water volume, make the monitoring of the lake water volume change more accurate, can reduce the amount of computation, thereby reducing requirements for the device for monitoring the water volume change. Moreover, the present application can realize long-term monitoring of the lake, thereby avoiding a waste of manpower and material resources caused by investigating the water volume changes on the site, and improving the measurement accuracy.

DETAILED DESCRIPTION

In order to make the objectives, technical solutions and advantages of the present application clearer and better understood, the present application will be further described in detail below with reference to the accompanying drawings and embodiments. It should be understood that the specific embodiments described herein are merely illustration of the present application, but not intended to limit the present application.

The term "changes" as a noun in the present application refers to or is exchangeable with "values of change". The term "lake water volume" in the present application refers to or is exchangeable with "water volume of the lake". The term "lake water level" in the present application refers to or is exchangeable with "water level of the lake". The term "sequence" in the present application refers to a set of data in time order (and also refers to time series).

Figure 1:
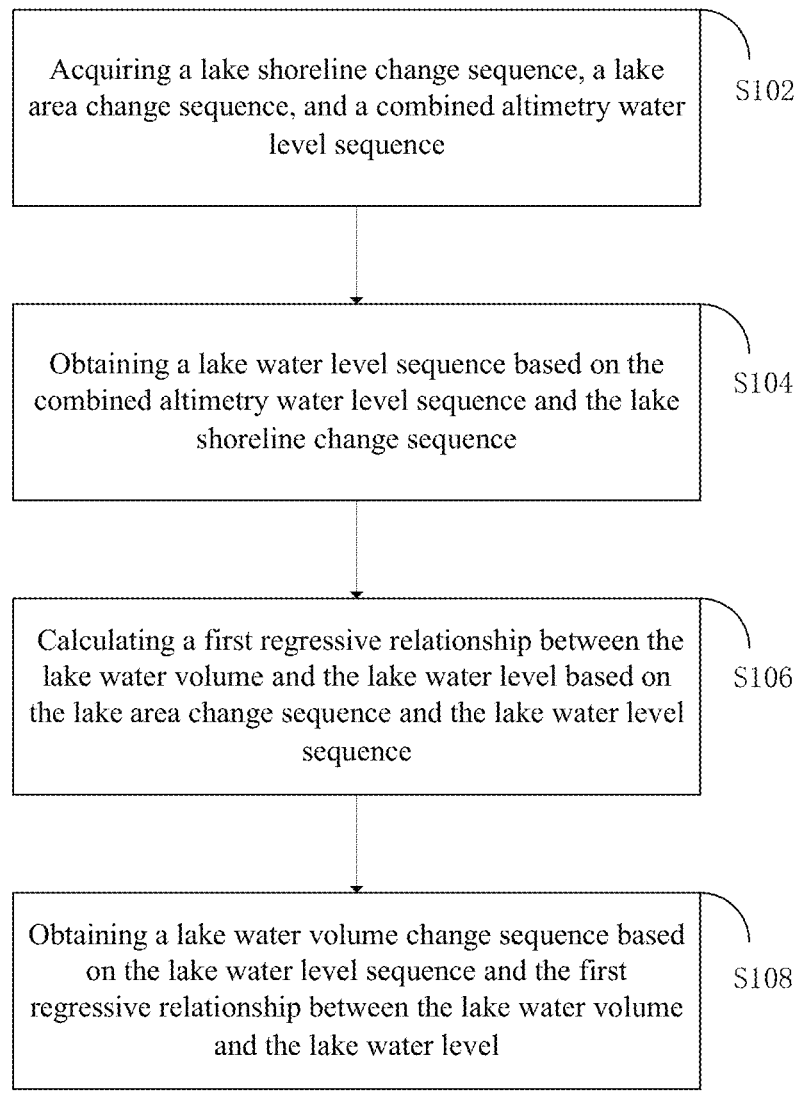
FIG. 1 is a schematic flow chart of an embodiment of a method for monitoring a water volume change.

Referring to FIG. 1, an embodiment of the present application provides a method for monitoring a water volume change. The method can be used for accurately monitoring a water volume change of a lake in a remote region, and can realize monitoring for the lake for a long time, so as to avoid a waste of manpower and material resources caused by investigating the water volume changes on the site and to improve the measurement accuracy. Specifically, the method includes following steps:

S102, acquiring a lake shoreline change sequence, a lake area change sequence, and a combined altimetry water level sequence;

S104, obtaining a lake water level sequence based on the combined altimetry water level sequence and the lake shoreline change sequence;

S106, calculating a first regressive relationship between the lake water volume and the lake water level based on the lake area change sequence and the lake water level sequence; and S108, obtaining a lake water volume change sequence based on the lake water level sequence and the first regressive relationship between the lake water volume and the lake water level.

In S102, the lake area is a range surrounded by the boundary line of the lake, and is also called a surface area of the lake. The water level (or gauge height or stage) refers to the elevation of the free water surface relative to a certain and predetermined base surface such as a specified vertical datum. A water depth refers to a distance from the water surface to the lake bottom. The lake shoreline change sequence refers to a set of data in time order, which are obtained based on remotely sensed images, and the set of data characterize (or represent) change of the shoreline of the lake with time. The lake area change sequence refers to a set of data in time order, which are obtained based on the remotely sensed images, and the set of data characterize (or represent) change of the lake area with time. The combined altimetry water level sequence refers to a set of altimetry data in time order, which are obtained based on data of the altimetry satellites, and the set of altimetry data accurately characterize (or represent) change of the water level of the lake with time.

Specifically, the lake shoreline change sequence, the lake area change sequence, and the combined altimetry water level sequence are obtained and used for calculating the water volume change of the lake.

In S104, the lake water level sequence refers to a set of data in time order characterizing (or representing) the change of the water level of the lake with time.

Specifically, the lake water level sequence is calculated based on the combined altimetry water level sequence and the lake shoreline change sequence. More specifically, an optical water level sequence is obtained based on the combined altimetry water level sequence and the lake shoreline change sequence, then the lake water level sequence is obtained based on the optical water level sequence and the combined altimetry water level sequence.

In S106, the first regressive relationship between the lake water volume and the lake water level refers to the first regressive relationship of the lake water volume changing with the lake water level.

Specifically, after the lake water level sequence is acquired, the first regressive relationship between the lake water volume and the lake water level is calculated and obtained based on the lake area change sequence and the lake water level sequence.

In an embodiment, a second regressive relationship between the lake area and the lake water level is calculated and obtained based on the lake area change sequence and the lake water level sequence. Then, the first regressive relationship between the lake water volume and the lake water level is obtained according to the second regressive relationship between the lake area and the lake water level. In the embodiment of the present application, the first regressive relationship between the lake water volume and the lake water level, and the second regressive relationship between the lake area and the lake water level both can be represented by mathematical functions.

In S108, the lake water volume change sequence refers to a set of data in time order characterizing (or representing) change of the lake water volume with time.

Specifically, the lake water volume change sequence is calculated based on the lake water level sequence and the first regressive relationship between the lake water volume and the lake water level.

In the method for monitoring the water volume change, the lake shoreline change sequence, the lake area change sequence, and the combined altimetry water level sequence are acquired; then the lake water level sequence is calculated based on the combined altimetry water level sequence and the lake shoreline change sequence; the first regressive relationship between the lake water volume and the lake water level is calculated and obtained based on the lake area change sequence and the lake water level sequence; and finally, the lake water volume change sequence is obtained based on the lake water level sequence and the first regressive relationship between the lake water volume and the lake water level. Through automatically extracting the lake shoreline change sequence and the lake area change sequence and remotely monitoring the lake water volume, the present application realizes accurately monitoring the lake water volume change, meanwhile, can realize a long-term monitoring of water volume change of the lake in remote area.

Figure 2:
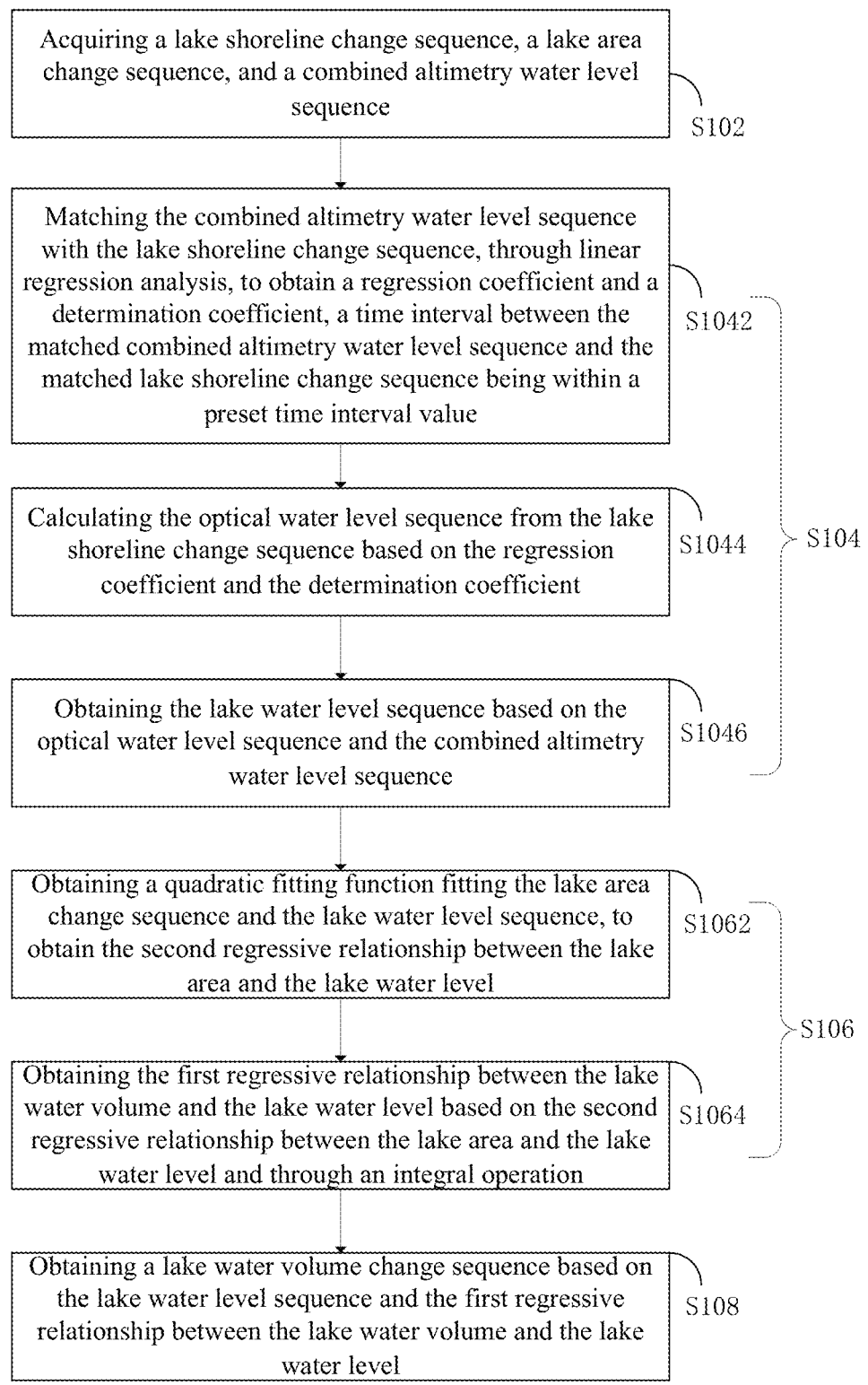
FIG. 2 is a schematic flow chart of another embodiment of the method for monitoring the water volume change.

In an embodiment, referring to FIG. 2, the step S104 can include following steps:

S1042, matching the combined altimetry water level sequence with the lake shoreline change sequence, through linear regression analysis, to obtain a regression coefficient and a determination coefficient, a time interval between the matched data of the combined altimetry water level sequence and the lake shoreline change sequence is within a preset time interval value;

S1044, calculating the optical water level sequence from the lake shoreline change sequence based on the regression coefficient and the determination coefficient; and S1046, obtaining the lake water level sequence based on the optical water level sequence and the combined altimetry water level sequence.

In S1042, the preset time interval value is predetermined and selected as needs. In the linear regression analysis, one of the water level and the lake shoreline change is the independent variable, and the other is the dependent variable. However, as the combined altimetry water level sequence and the lake shoreline change sequence are obtained separately, the data of the two sequences may not perfectly correspond with each other in time. To solve this problem, the time interval can be previously set, and once the time interval between a data point from the combined altimetry water level sequence and a data point from the lake shoreline change sequence is within the preset time interval value, the two data points can be approximately seen as at the same time thereby matching with each other to form a point in the coordinate system of the two variables for the linear regression analysis. In some embodiments, the preset time interval value can be five days. The regression coefficient refers to a parameter characterizing the influence of an independent variable on a dependent variable in the regression equation. The larger the regression coefficient, the greater the influence of the independent variable on the dependent variable. The determination coefficient characterizes a degree of linear fitting, so represents the linearity. The greater the determined coefficient, the better the degree of the linear fitting. The determination coefficient is ranged from 0 to 1, and is generally over 0.8. In the linear regression analysis, the linear equation between the water level and the lake shoreline change is obtained.

In an embodiment, data of the combined altimetry water level sequence and data of the lake shoreline change sequence within five days are selected and matched with each other, and the regression coefficient and the determination coefficient are calculated through the least squares method based on a matched result.

In S1044, specifically, the optical water level sequence is obtained based on the linear equation, the regression coefficient, and the determination coefficient from the lake shoreline change sequence. More specifically, data of the lake shoreline change sequence can be used to calculate the corresponding data, forming the optical water level sequence, through the linear equation between the water level and the lake shoreline change.

In S1046, specifically, after the optical water level sequence is obtained, the lake water level sequence is obtained by combining the optical water level sequence with the combined altimetry water level sequence through interpolation and extension. The optical water level sequence and the combined altimetry water level sequence can be interpolated and extended with each other in time order to form the lake water level sequence. All data contained in the optical water level sequence, and all data contained in the combined altimetry water level sequence can be rearranged according to a certain order (e.g., time order), to obtain the lake water level sequence. That is, the lake water level sequence can include all data of the optical water level sequence and all data of the combined altimetry water level sequence, arranged in time order.

In the above-described embodiment, a relatively accurate lake water level sequence is obtained by combining all the data that can be obtained, including the data from the altimetry satellites and the optical remote sensing satellites, which makes the sequence more accurate.

In an embodiment, the second regressive relationship is a quadratic regressive relationship, and referring to FIG. 2, the step S106 can include following steps:

S1062, obtaining a quadratic fitting function fitting the lake area change sequence and the lake water level sequence, to obtain the second regressive relationship between the lake area and the lake water level; and S1064, obtaining the first regressive relationship between the lake water volume and the lake water level according to the second regressive relationship between the lake area and the lake water level and through an integral operation.

In S1062, the second regressive relationship between the lake area and the lake water level characterizes change of the lake area with the water level.

Specifically, after the lake water level sequence is obtained, fit the lake area change sequence and the lake water level sequence with a quadratic function to obtain the relationship between the lake area and the lake water level.

Taking Selin Co Lake as an example, fit the lake area change sequence and the lake water level sequence with a quadratic function, then obtain a following equation I between the lake area and the lake water level:

$$S=1.05\Delta h^2+45.86\Delta h+344.6+1409.7=1.05\Delta h^2+45.86\Delta h+1754.3 \quad \text{I}$$

Where S represents the lake area, and $\Delta h$ represents the lake water level.

In S1064, specifically, after the second regressive relationship between the lake area and the lake water level is obtained, an integral operation is performed on the equation representing the second regressive relationship between the lake area and the lake water level, to obtain the first regressive relationship between the lake water volume and the lake water level.

Taking Selin Co Lake as an example, perform an integral operation on the equation I between the lake area and the lake water level, to obtain a following equation II representing the relationship between the lake water volume and the lake water level:

$$V = \frac{1.05}{3}\Delta h^3 + \frac{45.86}{2}\Delta h^2 + 1.754.3\Delta h = 0.35\Delta h^3 + 22.93\Delta h^2 + 1754.3\Delta h \quad \text{II}$$

Where V represents the lake water volume, and $\Delta h$ represents the lake water level.

In the method of this embodiment, the relationship between the lake area and the lake water level is obtained based on the lake area change sequence and the lake water level sequence, and the relationship between the lake water volume and the lake water level is obtained according to the relationship between the lake area and the lake water level. The obtained result is more accurate, which makes the measured lake water volume more accurate.

Figure 3:
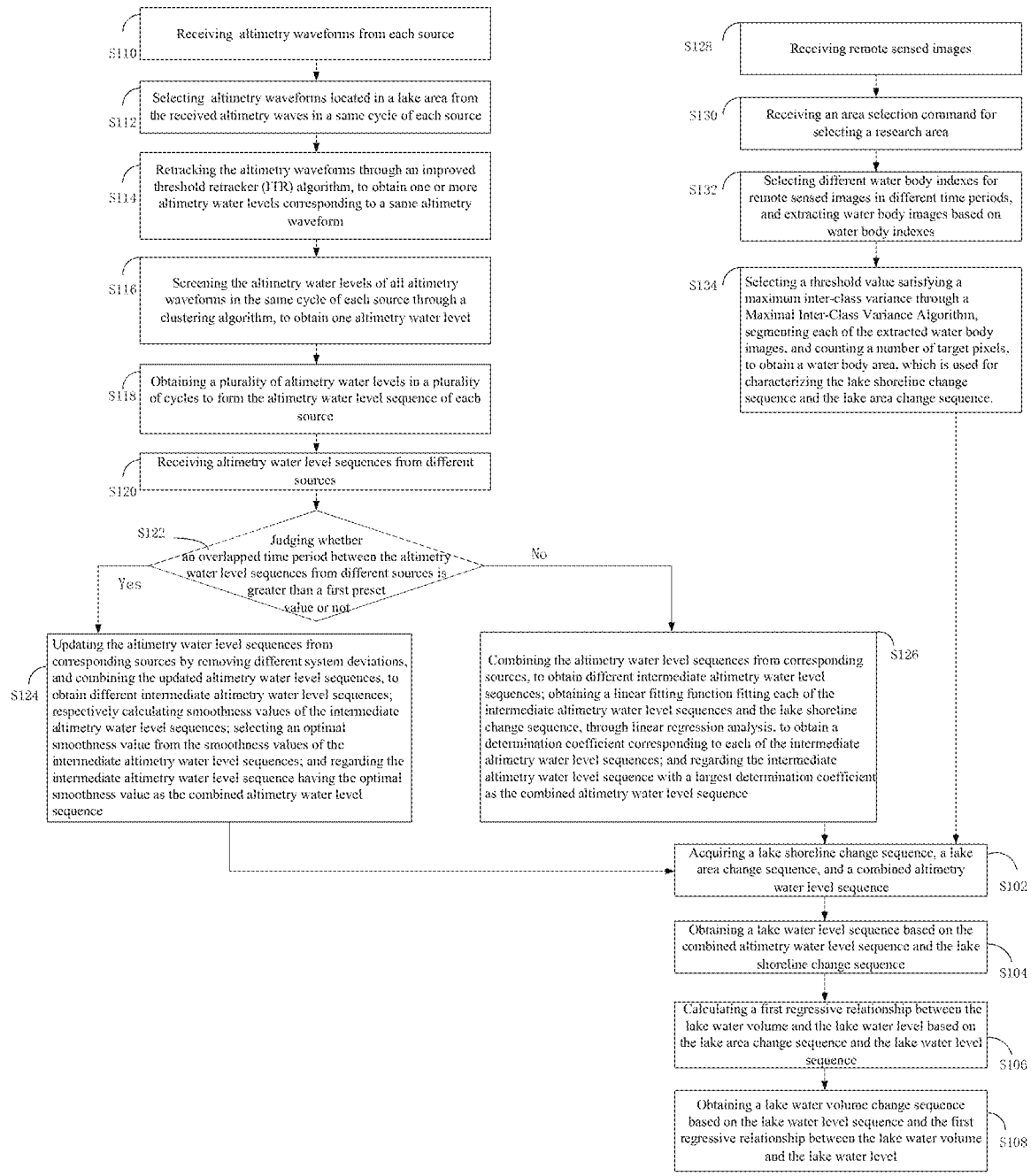
FIG. 3 is a schematic flow chart of yet another embodiment of the method for monitoring the water volume change.

In an embodiment, referring to FIG. 3, the method for monitoring the water volume change further includes following steps:

In an embodiment, referring to FIG. 3, the method for monitoring the water volume change further includes following steps:

S120, receiving altimetry water level sequences from different sources; and

S122, judging whether an overlapped time period between the altimetry water level sequences from different sources is greater than a first preset value or not;

S124, if the overlapped period between the altimetry water level sequences from different sources is larger than the first preset value, updating the altimetry water level sequences from corresponding sources by removing different system deviations, and combining the updated altimetry water level sequences, to obtain different intermediate altimetry water level sequences; respectively calculating smoothness values of the intermediate altimetry water level sequences; selecting an optimal smoothness value from the smoothness values of the intermediate altimetry water level sequences; and regarding the intermediate altimetry water level sequence having the optimal smoothness value as the combined altimetry water level sequence; and S126, if the overlapped period between the altimetry water level sequences from different sources is less than or equal to the first preset value, combining the altimetry water level sequences from corresponding sources, to obtain different intermediate altimetry water level sequences; obtaining a linear fitting function fitting each of the intermediate altimetry water level sequences and the lake shoreline change sequence, through linear regression analysis, to obtain a determination coefficient corresponding to each of the intermediate altimetry water level sequences; and regarding the intermediate altimetry water level sequence with a largest determination coefficient as the combined altimetry water level sequence.

In S120, the different sources (such as two or more sources) can be different altimetry satellites. The altimetry water level sequence refers to a set of altimetry data in time order, which are obtained by an altimetry satellite, the set of altimetry data characterizing (or representing) change of the water level of the lake with time. As different altimetry satellites may provide data at different time periods, the altimetry water level sequences from different sources can be joined or combined, to form a longer-term altimetry water level sequence, or the intermediate altimetry water level sequence. As system deviations, caused by instrument upgrading and reference ellipsoid selection and the like, may exist, two or more intermediate altimetry water level sequences having different system deviations can be formed.

In S122, the overlapped period refers to a time period, in which the data of the altimetry water level sequences from different sources are overlapped in time. For example, the observation periods of two or more altimetry satellites may overlap with each other in the overlapped period. The first preset value can be decided as needs.

Specifically, when the overlapped period of the altimetry water level sequences from different sources is larger than the first preset value, namely, when the altimetry water level sequences from different sources have an overlapped period, or when the overlapped period is relatively long, the step S124 is performed. When the overlapped period of the altimetry water level sequences from different sources is less than or equal to the first preset value, namely, when the altimetry water level sequences from different sources do not have the overlapped period, or when the overlapped period is relatively short, the step S126 is performed.

In S124, specifically, the altimetry water level sequence is updated by removing different system deviations of the altimetry water level sequences from different sources (if the system deviation is not zero) through compensation values, and the updated altimetry water level sequences from different sources are combined, to form one intermediate altimetry water level sequence. A set of intermediate altimetry water level sequences can be obtained corresponding to the altimetry water level sequences from different sources by removing different system deviations. Then, the smoothness value of each intermediate altimetry water level sequence is calculated.

Figure 4:
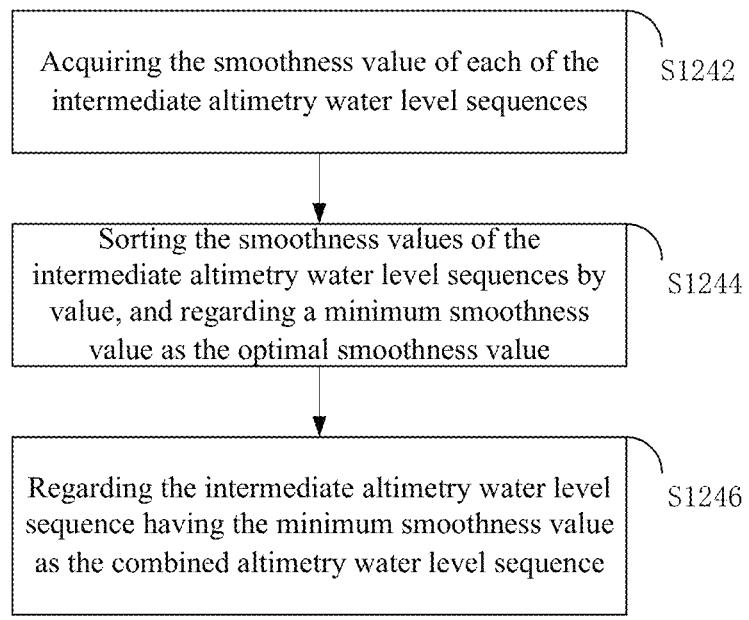
FIG. 4 is a schematic flow chart of an embodiment of a step S124.

Further, in an embodiment, referring to FIG. 4, the step S124 can include following steps:

S1242: acquiring a smoothness value of each of the intermediate altimetry water level sequences;

S1244, sorting the smoothness values of the intermediate altimetry water level sequences by value, and regarding a minimum smoothness value as the optimal smoothness value; and S1246, regarding the intermediate altimetry water level sequence having the optimal smoothness value as the combined altimetry water level sequence.

In S1242, the smoothness value represents the smooth degree of water level change with time, and the smoothest sequence has the optimal smoothness value. The smoothness value can be represented by M.

In S1244, the optimal smoothness value refers to an index indicating that the combined altimetry water level sequence is the smoothest one.

In an embodiment of S124, referring to the following Table 1, there are two altimetry water level sequences (respectively including data $H_i$ and $h_i$) from two sources, and it is judged that the overlapped period of the two altimetry water level sequences from the two sources is larger than the first preset value. The two altimetry water level sequences are updated (from the column of the original data into the columns of the first, second, third system deviations shown in Table 1) by removing their system deviations through the compensation values (A, B, and C respectively for the second source whose system deviation is not zero), and respectively combined to obtain the intermediate altimetry water level sequences. Then, the smoothness values M of the intermediate altimetry water level sequences are calculated respectively. The minimum smoothness value is selected among the multiple smoothness values as the optimal smoothness value. The intermediate altimetry water level sequences corresponding to the minimum smoothness value is regarded as the combined altimetry water level sequence.

According to the method in this embodiment, the altimetry water level sequences from different sources are combined, to obtain the combined altimetry water level sequence that is expanded in time and/or data number, which makes the combined altimetry water level sequence more accurate to characterize the change of the altimetry water level of the lake.

Figure 5:
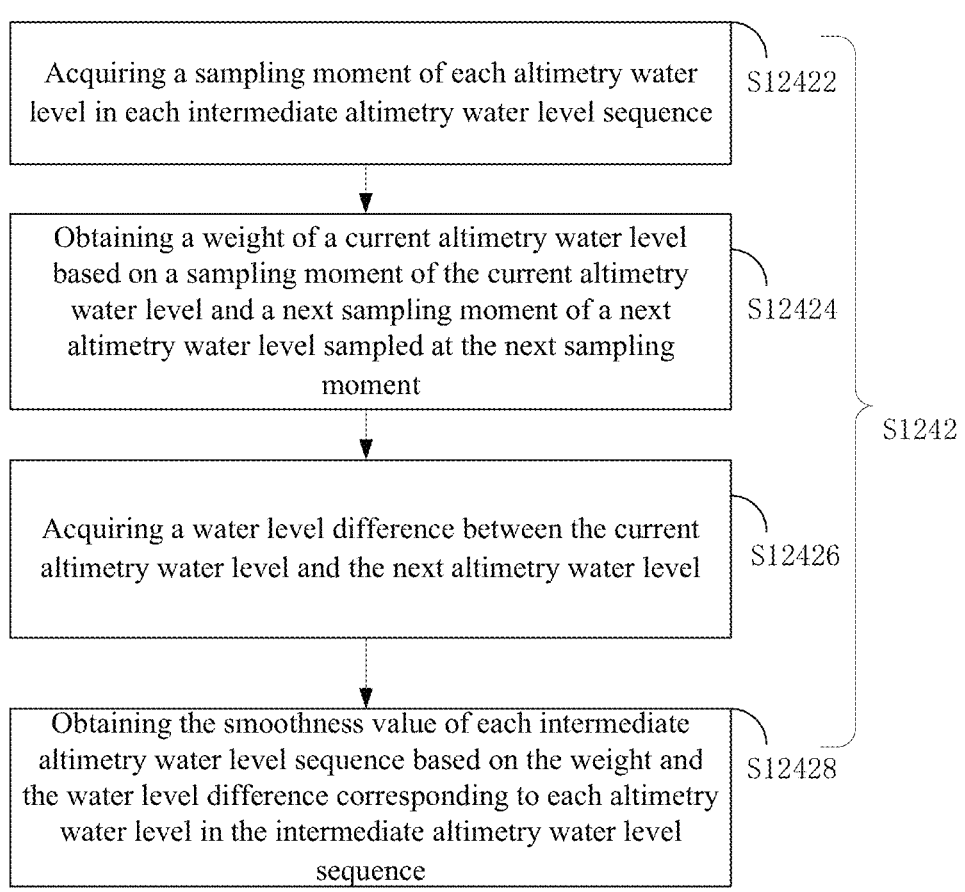
FIG. 5 is a schematic flow chart of an embodiment of a step S1242.

Further, referring to FIG. 5, the step S1242 of acquiring the smoothness value of each of the intermediate altimetry water level sequences further includes the following steps:

S12422, acquiring a sampling moment of each altimetry water level in each intermediate altimetry water level sequence;

S12424, obtaining a weight of a current altimetry water level based on a sampling moment of the current altimetry water level and a next sampling moment of a next altimetry water level sampled at the next sampling moment;

S12426, acquiring a water level difference between the current altimetry water level and the next altimetry water level; and S12428, obtaining the smoothness value of each intermediate altimetry water level sequence based on the weight and the water level difference corresponding to each altimetry water level.

In S12424, the weight is determined by the time interval between two sampling moments of two adjacent altimetry

TABLE 1

|  | Original Data | First System Deviation | Second System Deviation | Third System Deviation |
|---|---|---|---|---|
| First Source | $H_1, H_2 \ldots H_n$ | $H_1, H_2 \ldots H_n$ | $H_1, H_2 \ldots H_n$ | $H_1, H_2 \ldots H_n$ |
| Second Source | $h_1, h_2 \ldots h_n$ | $h_1 + A,$ $h_2 + A \ldots h_n + A$ | $h_1 + B,$ $h_2 + B \ldots h_n + B$ | $h_1 + C,$ $h_2 + C \ldots h_n + C$ |
| Intermediate Altimetry Water Level Sequence | $H_1, h_1, H_2, H_3,$ $h_2 \ldots h_n, H_n$ | $H_1, h_1 + A, H_2, H_3,$ $h_2 + A \ldots h_n + A, H_n$ | $H_1, h_1 + B, H_2, H_3,$ $h_2 + B \ldots h_n + B, H_n$ | $H_1, h_1 + C, H_2, H_3,$ $h_2 + C \ldots h_n + C, H_n$ |
| Smoothness Value (M) | $M_0$ | $M_1$ | $M_2$ | $M_3$ |

In S126, a set of intermediate altimetry water level sequences can be obtained as the same manner as that in S124. That is, the altimetry water level sequence is updated by compensating respectively the altimetry water level sequences from different sources by removing different system deviations (if the system deviation is not zero) through compensation values, and the updated altimetry water level sequences from different sources are combined, to form one intermediate altimetry water level sequence. A set of intermediate altimetry water level sequences can be obtained corresponding to the altimetry water level sequences from different sources by removing different system deviations. Then, a linear regression analysis is performed to obtain a linear fitting function fitting each intermediate altimetry water level sequence and the lake shoreline change sequence. The determination coefficient ($R^2$ or $r^2$) of the linear fitting can be calculated for each intermediate altimetry water level sequence, and the largest determination coefficient can be selected.

In an embodiment of S126, there are two altimetry water level sequences from two sources, and it is judged that the overlapped period of the two altimetry water level sequences from two different sources is less than or equal to the first preset value. In this case, the smoothness value of the intermediate altimetry water level sequence is not suitable for determining the combined altimetry water level sequence, and the goodness of fit (or the linearity or the determination coefficient) can be adopted.

water levels (namely, the current altimetry water level and the next altimetry water level).

Specifically, the sampling data of the current altimetry water level and the sampling moment of the next altimetry water level in the intermediate altimetry water level sequence are obtained, and the weight is obtained based on the two sampling moments.

In an embodiment, the weight is determined by the time interval between two sampling moments of two adjacent altimetry water levels as the following equation IV:

$$\omega_i = \frac{1}{1 + 0.1(T_{i+1} - T_i)} \qquad \text{IV}$$

Where $\omega_i$ is the weight, $T_i$ is a sampling moment (e.g., date) of the i-th the altimetry water level. For example, if the altimetry water levels from different sources are observed in a same day, or, if the time interval between the sampling moments of two adjacent intermediate altimetry water levels is zero, then the weight of either altimetry water level is 1. If two adjacent altimetry water levels from different sources are observed 10 days apart, or, if the time interval between the sampling moments of two adjacent intermediate altimetry water levels is 10 days, then the weight of the current altimetry water level is 0.5.

In S12426, specifically, according to the water level value corresponding to the current altimetry water level and the water level value corresponding to the next altimetry water level sampled at the next sampling time instant, an absolute value of a difference between the two water levels is calculated. That is, the absolute value of the difference of adjacent water levels in the intermediate altimetry water level sequence is calculated, thereby obtaining the variation of the altimetry water level.

In S12428, specifically, the smoothness value of each intermediate altimetry water level sequence is obtained through a weighted average calculation based on the weight and the water level difference corresponding to each altimetry water level in the intermediate altimetry water level sequence and. The calculated smoothness value can be regarded as an optimization index for deciding a specific intermediate altimetry water level sequence as the combined altimetry water level sequence.

In an embodiment, the formula for calculating the smoothness value can be:

$$M = \sum_{i=1}^{n-1} \omega_i |H_{i+1} - H_i|$$

Where M is the smoothness value of the intermediate altimetry water level sequence; $H_i$ is the i-th water level in the intermediate altimetry water level sequence; and $|H_{i+1} - H_i|$ is the absolute value of the difference of two adjacent water levels.

In an embodiment, referring to FIG. 3, before the step S120 of acquiring the altimetry water level sequences from different sources, the method further includes the following steps for each source:

S110, receiving altimetry waveforms from each source;

S112, selecting altimetry waveforms located in a lake area from the received altimetry waves in a same cycle of each source;

S114, retracking the altimetry waveforms through an improved threshold retracker (ITR) algorithm, to obtain one or more altimetry water levels corresponding to a same altimetry waveform;

S116, screening the altimetry water levels of all altimetry waveforms in the same cycle through a clustering algorithm, to obtain one altimetry water level; and S118, obtaining a plurality of altimetry water levels in a plurality of cycles to form the altimetry water level sequence of each source.

The water level of the lake can be acquired based on a measurement of a time interval between the transmission of a radar pulse from the altimetry satellite and the reception of the echo by the altimetry satellite, and the echo is in form of the altimetry waveform with a specific waveform. During the satellite passing over the lake in one cycle around the earth, a plurality of radar pulses are transmitted to the lake surface to form the "footprints." One altimetry waveform is the echo corresponding to one footprint.

In S112, specifically, after the altimetry waveforms are received, the waves located in the lake area can be selected according to the shape of the waveforms or an estimation of the passing time of the satellite over the lake, and the waves located in the lake area are called "altimetry waveforms".

For example, in a ground track of Jason-½ passes through Chibuzhangcuo Lake in the Qinghai-Tibet Plateau, the average number of the footprints located in the lake surface in each cycle is about 19 or 20, so 19 or 20 of altimetry waveforms can be obtained.

In S114, each of the altimetry waveforms is retracked through the ITR algorithm, to obtain one or more altimetry water levels corresponding to the same altimetry waveform.

In S116, the clustering algorithm is to evaluate the similarity of the altimetry water levels of the altimetry waveforms in one cycle, to select one altimetry water level value as a water level of the altimetry water level sequence.

In S118, the altimetry water levels in different time periods, such as different cycles of the satellite, can be obtained to form the set of data of the altimetry water level sequence for each source. The altimetry water level sequences from different sources can be obtained similarly. The altimetry water level sequences from different sources are to be combined, to obtain the combined altimetry water level sequence.

Figure 6:
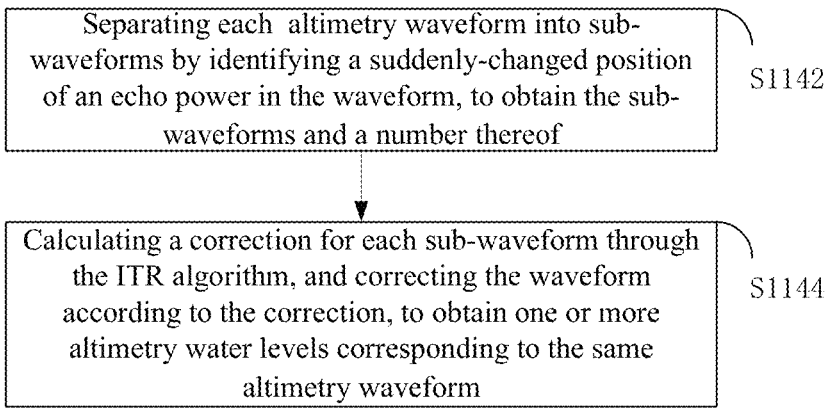
FIG. 6 is a schematic flow chart of an embodiment of a step S114.

In an embodiment, referring to FIG. 6, the step S114 can include following steps:

S1142, separating each altimetry waveform into sub-waveforms by identifying a suddenly-changed position of an echo power in the waveform, to obtain the sub-waveforms and a number thereof; and S1144, calculating a correction for each sub-waveform through the ITR algorithm, and correcting the waveform according to the correction, to obtain one or more altimetry water levels corresponding to the same altimetry waveform.

In an embodiment, the correction for each sub-waveform can be calculated through the ITR algorithm with a threshold value of 50%.

Figure 7:
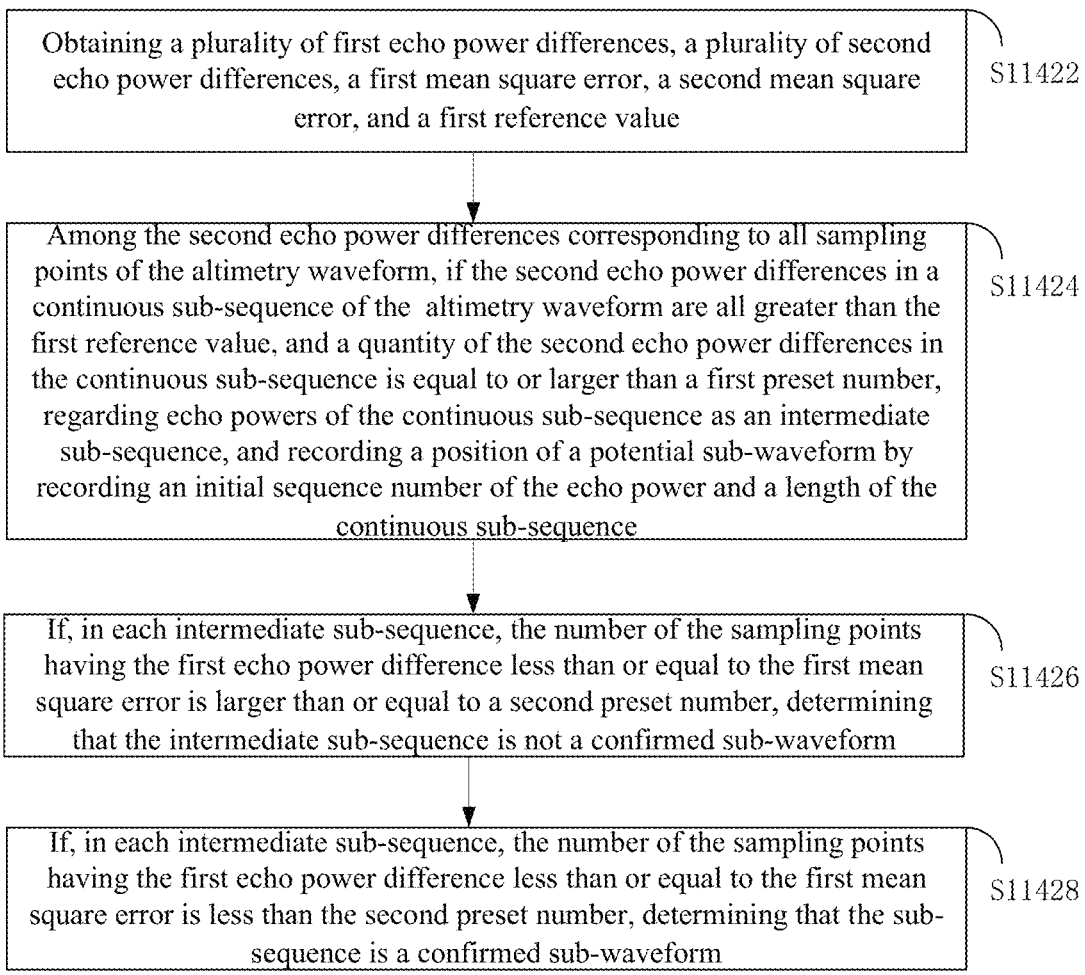
FIG. 7 is a schematic flow chart of an embodiment of a step S1142.

In an embodiment, referring to FIG. 7, the step S1142 of separating each altimetry waveform into sub-waveforms includes following steps:

S11422, obtaining a plurality of first echo power differences, a plurality of second echo power differences, a first mean square error, a second mean square error, and a first reference value;

S11424, among the second echo power differences corresponding to all sampling points of the altimetry waveform, if the second echo power differences in a continuous sub-sequence of the altimetry waveform are all greater than the first reference value, and a quantity of the second echo power differences in the continuous sub-sequence is equal to or larger than a first preset number, regarding echo powers of the continuous sub-sequence as an intermediate sub-sequence, and recording a position of a potential sub-waveform by recording an initial sequence number of the echo power and a length of the continuous sub-sequence;

S11426, if, in each intermediate sub-sequence, the number of the sampling points having the first echo power difference less than or equal to the first mean square error is larger than or equal to a second preset number, determining that the intermediate sub-sequence is not a confirmed sub-waveform; and S11428, if, in each intermediate sub-sequence, the number of the sampling points having the first echo power difference less than or equal to the first mean square error is less than the second preset number, determining that the sub-sequence is a confirmed sub-waveform.

The altimetry waveform can be obtained by the altimetry satellite by detecting a serial of echo powers in a time period to form a serial of sampling points, the serial of echo powers form the waveform of the altimetry waveform.

In S11422, the first echo power difference represents a difference between the echo powers of adjacent sampling points. The second echo power difference represents a difference between the echo powers of two spaced sampling points. The first mean square error represents the mean square error of the adjacent sampling points. The second mean square error represents the mean square error of the two spaced sampling points. The first reference value can be calculated according to the second mean square error. For example, the first reference value can be 0.1 times of the second mean square error.

Specifically, the space between the sampling points for calculating the second echo power difference can be preset as needs. In an embodiment, the space can be one sampling point. The first echo power differences of every two adjacent sampling points, and the second echo power differences of every two spaced sampling points are calculated.

In S11424, the first preset number can be decided as needs. In an embodiment, the first preset number is 3. The first reference value can be preset as needs. In the continuous sub-sequence, the echo powers of the sampling points increase quick to have the second echo power differences all greater than the first reference value. The initial sequence number and the length are recorded to serve as identifying the position of the potential sub-waveform. For example, calculate the second echo power differences (D2) for all sampling points to form a D2 sequence, search all second echo power differences greater than the first reference value in the D2 sequence. If three or more second echo power differences greater than the first reference value are adjacent one by one, regard the echo powers of the sampling points corresponding to the three or more second echo power differences as a sub-sequence, and record the initial sequence number and the length to identify the position of each potential sub-waveform.

In S11426, the second preset number can be selected as needs. In an embodiment, the second preset number is 2. Specifically, after each sub-sequence and the position of each potential sub-waveform are obtained, calculate the number of the sampling points in each sub-sequence respectively, where the first echo power difference is less than or equal to the first mean square error. When the number of the sampling points is larger than or equal to the second preset number, determine that the sub-sequence is not a confirmed sub-waveform. For example, calculate the number of the sampling points in each sub-sequence respectively, where the first echo power difference (D1) corresponding to the sampling point is less than or equal to the first mean square error (S1). When the first echo power differences of two or more sampling points are less than or equal to the first mean square error S1, determine that the sub-sequence is not a confirmed sub-waveform.

In S11428, specifically, after each sub-sequence and the position of each potential sub-waveform are obtained, calculate the number of the sampling points in each sub-sequence respectively, where the first echo power difference is less than or equal to the first mean square error. When the number of the sampling points is less than the second preset number, judge that the sub-sequence is a confirmed sub-waveform. For example, calculate the number of the sampling points in each sub-sequence respectively, where the first echo power difference (D1) corresponding to the sampling point is less than or equal to the first mean square error (S1). When the first echo power difference of less than two sampling points is less than or equal to the first mean square error S1, determine that the sub-sequence is a confirmed sub-waveform.

Figure 8:
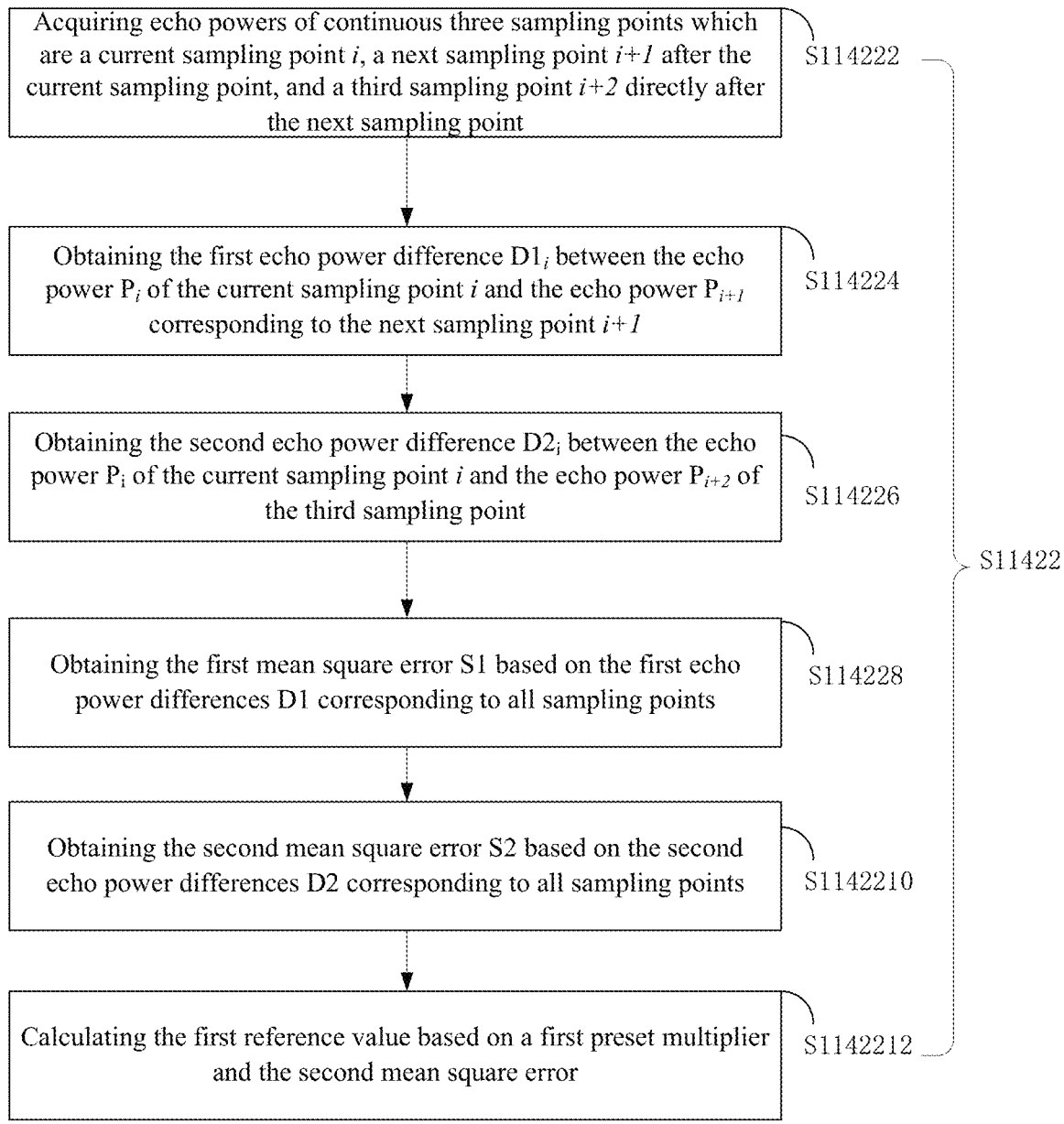
FIG. 8 is a schematic flow chart of an embodiment of a step S11422.

Further, referring to FIG. 8, the step S11422 of obtaining a plurality of the first echo power differences, a plurality of second echo power differences, the first mean square error, the second mean square error, and the first reference value includes following steps:

S114222, acquiring echo powers of continuous three sampling points which are a current sampling point i, a next sampling point i+1 after the current sampling point, and a third sampling point i+2 directly after the next sampling point;

S114224, obtaining the first echo power difference $D1_i$ between the echo power $P_i$ of the current sampling point i and the echo power $P_{i+1}$ corresponding to the next sampling point i+1;

S114226, obtaining the second echo power difference $D2_i$ between the echo power $P_i$ of the current sampling point i and the echo power $P_{i+2}$ of the third sampling point;

S114228, obtaining the first mean square error S1 based on the first echo power differences D1 corresponding to all sampling points;

S1142210, obtaining the second mean square error S2 based on the second echo power differences D2 corresponding to all sampling points; and

S1142212, calculating the first reference value based on a first preset multiplier and the second mean square error.

In S11424, the first echo power difference $D1_i$ corresponding to the current sampling point i is obtained based on the echo power $P_i$ of the current sampling point i and the echo power $P_{i+1}$ of the next sampling point i+1. That is, the differences between the echo powers of two adjacent sampling points are obtained.

For example, the difference between the echo powers of the adjacent sampling points is calculated as following equation V.

$$D1_i = P_{i+1} - P_i \qquad \text{V}$$

In S114226, specifically, the second echo power difference $D2_i$ corresponding to the current sampling point i is obtained based on the echo power $P_i$ of the current sampling point i and the echo power $P_{i+2}$ of the third sampling point. That is, the differences between the echo powers of two spaced sampling points are obtained.

For example, the difference between the echo powers of the two spaced sampling points is calculated as following equation VI.

$$D2_i = P_{i+2} - P_i \qquad \text{VI}$$

In S114228, specifically, the first mean square error S1 corresponding to all first echo power differences $D1_i$, $i=1$ to $N-1$ is obtained for all of the sampling points of the altimetry waveform. That is, the mean square error of the differences between the echo powers of all two adjacent sampling points is calculated.

For example, the mean square error of the differences between the echo powers of all two adjacent sampling points is calculated as following equation VII.

$$S1 = \sqrt{\frac{(N-1)\sum_{i=1}^{N-1} D1_i^2 - \left(\sum_{i=1}^{N-1} D1_i\right)^2}{(N-1)(N-2)}} \qquad \text{VII}$$

Where S1 represents the first mean square error; N represents the number of the sampling points of the altimetry waveform.

In S1142210, specifically, the second mean square error S2 corresponding to all second echo power differences $D2_i$, $i=1$ to $N-2$ is obtained for all of the sampling points of the altimetry waveform. That is, the mean square error of the differences between the echo powers of all two spaced sampling points is calculated.

For example, the mean square error of the differences between the echo powers of all two spaced sampling points is calculated as following equation VIII.

$$S2 = \sqrt{\frac{(N-2)\sum_{i=1}^{N-2} D2_i^2 - \left(\sum_{i=1}^{N-2} D2_i\right)^2}{(N-3)(N-2)}} \quad \text{VIII}$$

Where S2 represents the second mean square error; N represents the number of the sampling points of the altimetry waveform.

In S1142212, the first preset multiplier can be selected as needs. For example, the first preset multiplier can be set to be 0.1.

Specifically, the first reference value is calculated according to the first preset multiplier and the second mean square error. For example, the first reference value can be obtained by S2 multiplied by 0.1 (namely, S2*0.1).

Figure 9:
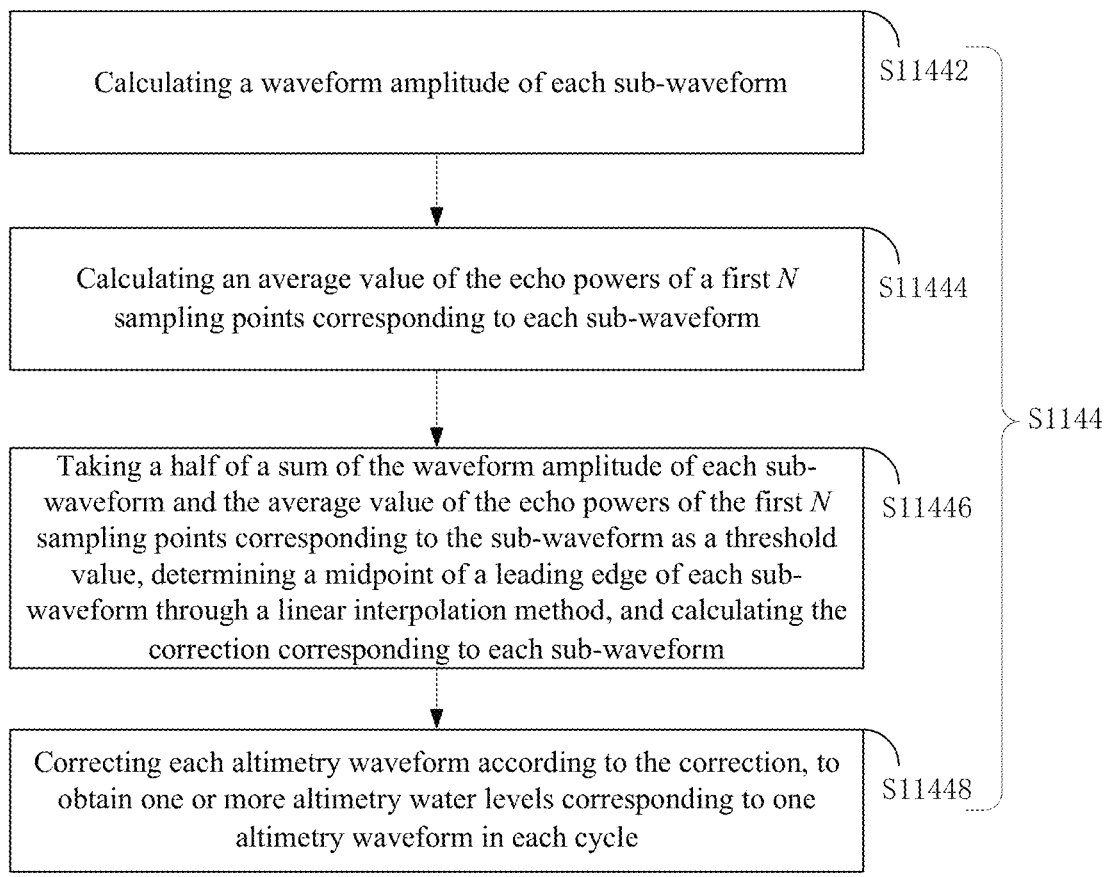
FIG. 9 is a schematic flow chart of an embodiment of a step S1144.

In an embodiment, referring to FIG. 9, the step S1144 of calculating the correction for each sub-waveform through the ITR algorithm can include the following steps:

S11442, calculating a waveform amplitude of each sub-waveform;

S11444, calculating an average value of the echo powers of a first N sampling points corresponding to each sub-waveform;

S11446, taking a half of a sum of the waveform amplitude of each sub-waveform and the average value of the echo powers of the first N sampling points corresponding to the sub-waveform as a threshold value, determining a midpoint of a leading edge of each sub-waveform through a linear interpolation method, and calculating the correction corresponding to each sub-waveform; and S11448, correcting each altimetry waveform according to the correction, to obtain one or more altimetry water levels corresponding to one altimetry waveform in each cycle.

In S11442, specifically, after the sub-waveform is obtained, the waveform amplitude of each sub-waveform is calculated according to each of the obtained sub-waveforms.

For example, the calculation formula for the waveform amplitude can be:

$$A = \sqrt{\frac{\sum_{i=m}^{k} P_i^4}{\sum_{i=m}^{k} P_i^2}}$$

Where A represents the waveform amplitude of the sub-waveform, and $P_m$, $P_{m+1}$, $P_k$ represent the echo powers of corresponding sampling points m, m+1 and k respectively. The sampling points m to k corresponds to the sub-waveforms.

In S11444, where N is a positive integer greater than or equal to 1; and N can be selected to be 5.

Specifically, the average value of the echo powers of the first N sampling points corresponding to each sub-waveform is calculated.

For example, the average value of the echo powers of the first N sampling points is calculated as follows:

$$P0 = \frac{1}{N}\sum_{i=1}^{N} P_i$$

Wherein P0 represents the average value of the echo powers of the first N sampling points.

In S11446, specifically, a half of the sum of the waveform amplitude A of each sub-waveform and the average value P0 of the echo powers of the first N sampling points is set to be the threshold value. The midpoint of the leading edge of each sub-waveform is determined through the linear interpolation method, and the correction corresponding to each sub-waveform is calculated. After the threshold value is obtained, a position of the sub-waveform having the echo power equal to the threshold value is determined through the linear interpolation method, and then the position is regarded as the midpoint of the leading edge of the sub-waveform, and the correction corresponding to each sub-waveform is calculated.

The calculation formula for the threshold value can be as follows:

Threshold=½(A+P0)

Where Threshold represents the threshold value.

In S11448, specifically, after the correction is obtained, the waveform from each source is corrected according to the correction. After each altimetry waveform is corrected through the ITR algorithm, one or more altimetry water levels corresponding to one altimetry waveform in each cycle are obtained.

Figure 10:
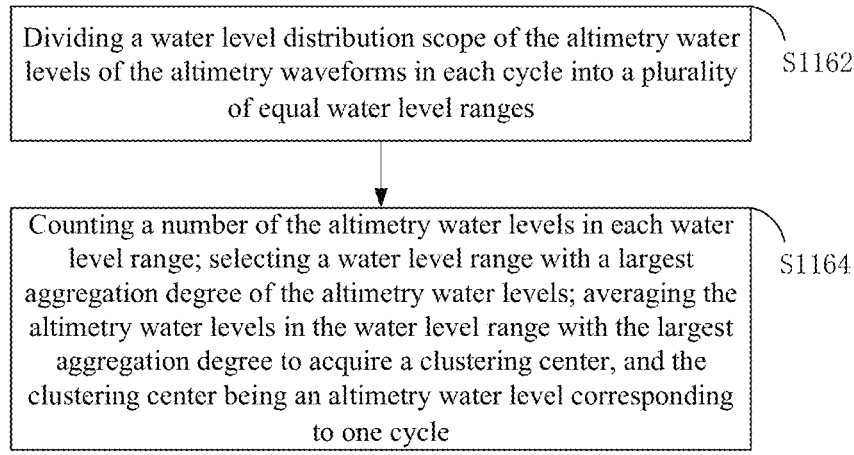
FIG. 10 is a schematic flow chart of an embodiment of a step S116 of screening through a clustering algorithm.

In an embodiment, referring to FIG. 10, the step S116 includes following steps:

S1162, dividing a water level distribution scope of the altimetry water levels of the altimetry waveforms in each cycle into a plurality of equal water level ranges; and S1164, counting the number of the altimetry water levels in each water level range; selecting the water level range with a largest aggregation degree of the altimetry water levels; averaging the altimetry water levels in the water level range with the largest aggregation degree to acquire a clustering center, and the clustering center being an altimetry water level corresponding to one cycle.

In S1162, specifically, the altimetry water levels of all altimetry waveforms in each cycle are distributed in the water level distribution scope, one end is the smallest value and the other end is the largest value. The distribution scope is divided into a plurality of water level ranges with the same size. The size of each water level range can be set as needs, such as 0.3 meters.

In S1164, the aggregation degree represents the number of altimetry water levels in each water level range.

Specifically, a number of the altimetry water levels in each water level range is counted. An aggregation degree histogram is drawn based on an aggregation degree of the number of the altimetry water levels. The water level range with the largest aggregation degree is selected. The average value of the altimetry water levels in the water level range with the largest aggregation degree is calculated. The average value calculated is regarded as the clustering center, and the clustering center is regarded as the altimetry water level corresponding to this cycle.

In the method of this embodiment, the altimetry water level corresponding to each cycle is obtained through cluster screening, to find if a majority of the water levels is aggregated in the small range, and adopt the average of the water levels in this small range as the water level corresponding to the cycle.

Figure 11:
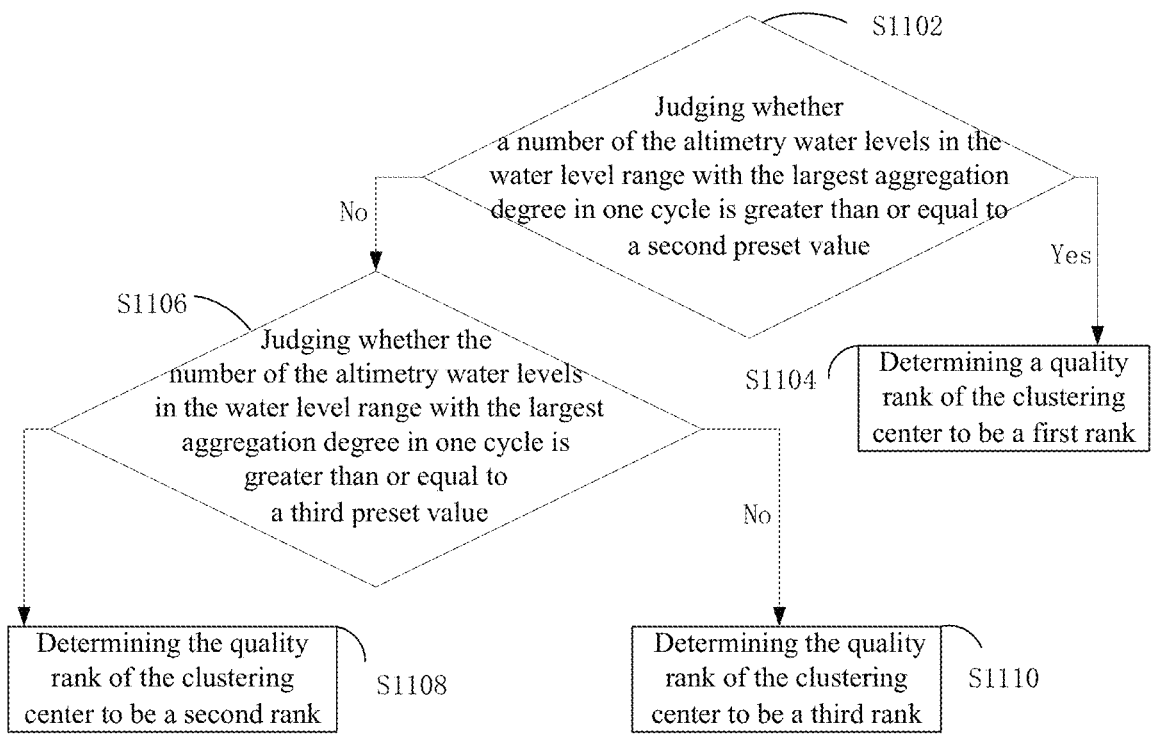
FIG. 11 is a schematic flow chart of an embodiment of grading a quality rank of a clustering center.

In an embodiment, referring to FIG. 11, S116 further includes grading the obtained clustering center into different quality ranks, including following sub-steps:

S1102, judging whether the number of the altimetry water levels in the water level range with the largest aggregation degree in one cycle is greater than or equal to a second preset value;

S1104, if the number of the altimetry water levels in the water level range with the largest aggregation degree in one cycle is larger than or equal to the second preset value, determining the quality rank of the clustering center to be a first rank;

S1106, if the number of the altimetry water levels in the water level range with the largest aggregation degree in one cycle is less than the second preset value, judging whether the number of the altimetry water levels in the water level range with the largest aggregation degree in one cycle is greater than or equal to a third preset value;

S1108, if the number of the altimetry water levels in the water level range with the largest aggregation degree in one cycle is less than the second preset value, and if the number of the altimetry water levels in the water level range with the largest aggregation degree in one cycle is greater than or equal to the third preset value, determining the quality rank of the clustering center to be a second rank; and S1110, if the number of the altimetry water levels in the water level range with the largest aggregation degree in one cycle is less than the third preset value, determining the quality rank of the clustering center to be a third rank.

In S1102, the second preset value can be selected as needs. For example, the second preset value can be set to be 80%.

Specifically, for the obtained clustering center, judge whether the number of the altimetry water levels in the water level range with the largest aggregation degree in one cycle is greater than or equal to the second preset value. That is, count the number of the altimetry water levels in the water level range with the largest aggregation degree in one cycle; compare the counted number with the second preset value; and judge whether the counted number is greater than or equal to the second preset value. For example, judge whether 80% or more of all of the altimetry water levels are located in the water level range with the maximum aggregation degree.

If yes, namely, if the number of the altimetry water levels in the water level range with the largest aggregation degree in one cycle is larger than or equal to the second preset value, the step S1104 of determining the quality rank of the clustering center to be a first rank is executed.

Specifically, when the number of the altimetry water levels in the water level range with the largest aggregation degree in one cycle is larger than or equal to the second preset value, the quality rank of the clustering center is determined to be the first rank. For example, when 80% or more of all of the altimetry water levels are located in the water level range with the maximum aggregation degree, the quality rank of the clustering center is determined to be the first rank.

If not, namely, if the number of the altimetry water levels in the water level range with the largest aggregation degree in one cycle is less than the second preset value, the step S1106 of judging whether the number of the altimetry water levels in the water level range with the largest aggregation degree in one cycle is greater than or equal to a third preset value is executed.

The second preset value is larger than the third preset value, and the third preset value can be set as needs. For example, the third preset value can be set to be 50%.

Specifically, if it is judged that the number of the altimetry water levels in the water level range with the largest aggregation degree in one cycle is less than the second preset value, continue to judge whether the number of the altimetry water levels in the water level range with the largest aggregation degree in one cycle is greater than or equal to the third preset value. The counted number is compared with the third preset value, and judge whether the counted number is greater than or equal to the third preset value. For example, if the counted number is less than 80%, judge whether the counted number is larger than 50% or not.

If yes, that is, if the number of the altimetry water levels in the water level range with the largest aggregation degree in one cycle is less than the second preset value, and if the number of the altimetry water levels in the water level range with the largest aggregation degree in one cycle is greater than or equal to the third preset value, the step S1108 of determining the quality rank of the clustering center to be a second rank is executed.

Specifically, when it is judged that the number of the altimetry water levels in the water level range with the largest aggregation degree in one cycle is less than the second preset value, and greater than or equal to the third preset value, the quality rank of the clustering center is determined to be the second rank. For example, when the number of the altimetry water levels in the water level range with the largest aggregation degree in one cycle is less than 80% and greater than 50%, the quality rank of the clustering center is determined to be the second rank.

If not, that is, if the number of the altimetry water levels in the water level range with the largest aggregation degree in one cycle is less than the third preset value, the step S1110 of determining the quality rank of the clustering center to be a third rank is executed.

Specifically, when it is judged that the number of the altimetry water levels in the water level range with the largest aggregation degree in one cycle is less than the third preset value, the quality rank of the clustering center is determined to be the third rank. That is, the number of the altimetry water levels in the water level range with the largest aggregation degree in one cycle is counted. When it is judged that the counted number is less than or equal to the third preset value, the quality rank of the clustering center is determined to be the third rank. For example, when the counted number of the altimetry water levels in the water level range with the largest aggregation degree in one cycle is less than or equal to 50%, the quality rank of the clustering center is determined to be the third rank.

In an embodiment, S116 further includes discarding the data having the clustering center in the third rank. The third ranked data is removed from the altimetry water level sequence.

Figure 12:
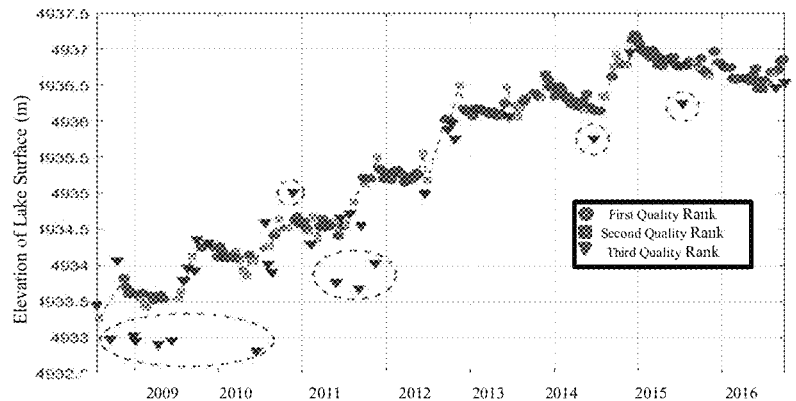
FIG. 12 is a schematic diagram illustrating a result of screening through a clustering analysis method.

Referring to FIG. 12, taking JASON-2 data of Chibuzhangcuo Lake as an example, the result of screening the altimetry water levels through the clustering analysis method is shown in the figure. In an embodiment, when an altimetry water level has a clustering center in the third quality rank, and a difference between the altimetry water level and an adjacent altimetry water level thereof is larger than or equal to a preset threshold value, the altimetry water level is excluded. As shown in the figure, among the data points with the clustering centers in the third rank, a part of data points maybe obviously deviate from adjacent water levels of the data points. The water level of a large lake could not have a sudden change of several meters, therefore such abnormal data points are removed.

In this embodiment, the clustering centers are classified by quality ranks, so that the altimetry water levels are screened, to obtain more accurate and more precise altimetry water levels.

In an embodiment, referring to FIG. 3, the method for monitoring the water volume change can further include following steps:

S128, receiving remotely sensed images;

S130, receiving an area selection command for selecting a research area;

S132, selecting different water body indexes for the remotely sensed images in different time periods, and extracting water body images from the remotely sensed images based on the water body indexes; and S134, selecting a threshold value satisfying a maximum inter-class variance through a Maximal Inter-Class Variance Algorithm (or Otsu's method), binarizing each of the extracted water body images, and counting a number of target pixels, to obtain a water body area, which is used for characterizing the lake shoreline change sequence and the lake area change sequence.

In S128, specifically, the remotely sensed images are received and used for subsequent steps.

In S130, specifically, when the area selection command is received, the research area is selected. The area selection command can be input by an operator through an input equipment and the like.

Figure 13:
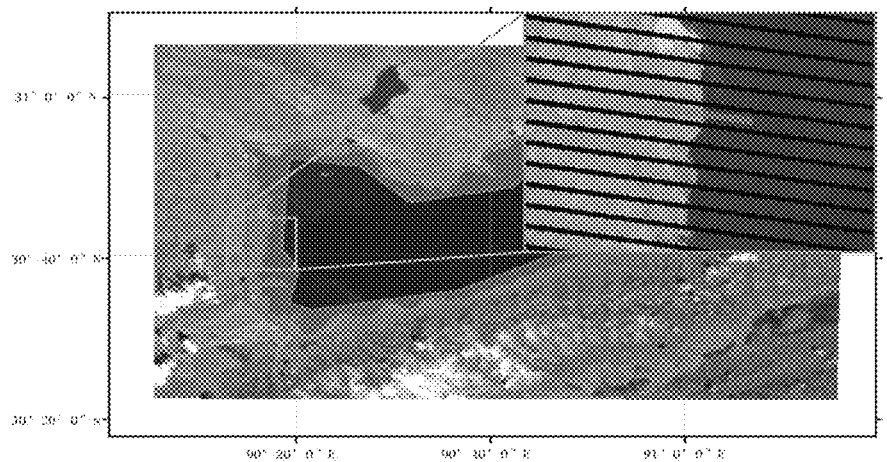
FIG. 13 is a schematic diagram illustrating a research area selection.

For example, during extracting the lake shoreline change, in order to make use of the remotely sensed images as many as possible and to avoid cloud and image strip interferences, the research area, as shown in FIG. 13, can be selected to be a striped area. A width of the research area can be from 10 to 20 pixels (less than an interval width of a Landsat 7 strip), and a length of the research area can be about 100 pixels. If the research area is too narrow, an extracted result of the water body is easily dispersed; if the research area is too large, it is easily influenced by cloud coverage and Landsat 7 strips, which causes more defective pixels.

For example, during extracting the lake area change, in order to reduce amount of computation and influences of cloud, a water level fluctuation band of a lake shore can be selected to be the research area (shown in FIG. 13), and the lake area changes of the area is counted. During establishing a mathematical relation between the lake area and the water level, the unselected area of the lake center is added to the water level fluctuation band of the lake shore.

In S132, specifically, the remotely sensed images received can be of different time periods, and different water body indexes for the images of different time periods are selected. The water body images are extracted from the remotely sensed images of different time periods through different water body indexes.

In S134, specifically, after the water body image is extracted, the water body area is obtained by binarizing the water body image through grey image segmentation adopting the Maximal Inter-Class Variance Algorithm (or Otsu's method). Through selecting the threshold value meeting the maximum inter-class variance, the extracted water body image is segmented, and the number of target pixels is counted, to obtain the water body area. The water body area is used for characterizing the lake shoreline change sequence and the lake area change sequence.

For example, the threshold value is set to be a grey level t; if the grey level of a pixel is larger than t, the pixel is set to be a target; if the grey level of a pixel is less than or equal to t, the pixel is set to be a background; the mean value of grey levels the target pixels is $\mu_0$, and a percentage of the target pixels is $w_0$; the mean value of grey levels the background pixels is $\mu_1$, and a percentage of the background pixels is $w_1$. The function of variance between clusters can be expressed as follows:

$$g = w_0 \times w_1 \times (\mu_0 - \mu_1)^2$$

The threshold value t is selected based on making inter-class variance maximum. The water body image is segmented, and the number of the target pixels is counted, then the area of the water body can be obtained. As for a Landsat series image, the actual area represented by each pixel is 900 m².

In the method of this embodiment, the remotely sensed images are processed, to obtain an accurate lake shoreline change sequence and the lake area change sequence, thereby making the calculated result more accurate.

Figure 14:
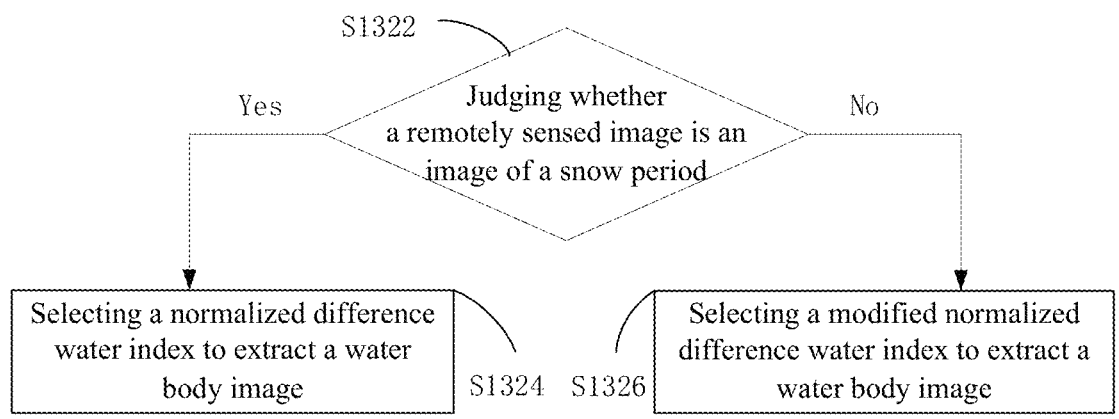
FIG. 14 is a schematic flow chart of an embodiment of a step S132 of selecting different water body indexes.

In an embodiment, referring to FIG. 14, the step S132 can further include following steps:

S1322, judging whether the remotely sensed image is an image of a snow period;

S1324, if the remotely sensed image is the image of the snow period, selecting a normalized difference water index to extract the water body image; and S1326, if the remotely sensed image is not the image of the snow period, selecting a modified normalized difference water index to extract a water body image.

In S1322, specifically, when the remotely sensed image is judged to be the image of the snow period, the step S1324 is executed. When the remotely sensed image is judged not to be the image of the snow period, the step S1326 is executed.

In S1324, specifically, when the remotely sensed image is judged to be the image of the snow period, the Normalized Difference Water Index (NDWI) is selected to extract the water body image.

The Normalized Difference Water Index (NDWI) is calculated as follows:

$$NDWI = \frac{B_{Green} - B_{NIR}}{B_{Green} + B_{NIR}}$$

Where $B_{Green}$ represents a green light band of a Landsat Series image, and $B_{NIR}$ represents the near-infrared band. As for the near-infrared band, as the difference between the reflectance of the snow body and the reflectance of the water body is large, the snow body and the water body can be distinguished by the NDWI. Under the condition that the lake shore is covered by accumulated snow in winter, the water body extraction through the NDWI has higher precision.

In S1326, when the remotely sensed image is judged not to be the image of the snow period, the Modified Normalized Difference Water Index (MNDWI) is selected and used to extract the water body image.

The Modified Normalized Difference Water Index (MNDWI) is calculated as follows:

$$MNDWI = \frac{B_{Green} - B_{SIR}}{B_{Green} + B_{SIR}}$$

Where $B_{SIR}$ represents a short-wave infrared band. As the accumulated snow on a shore side and the water surface cannot be distinguished by the MNDWI, the lake area extracted in winter is easy to be larger. In the time period without accumulated snow, previous researches show that the water body image extraction through the MNDWI has higher precision.

Figure 15:
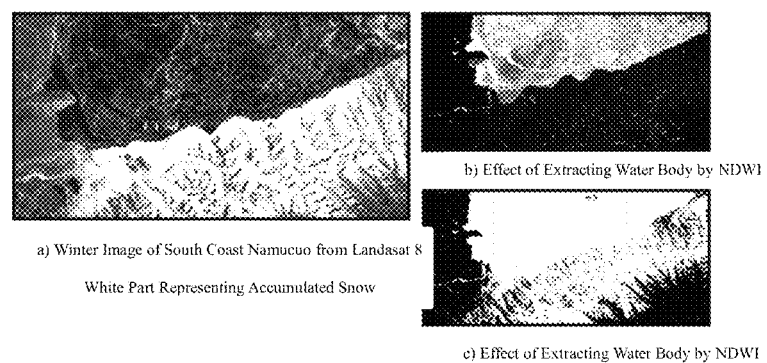
FIG. 15 shows illustrating results extracted from remotely sensed images of a snow period by using two different water body indexes.

As shown in FIG. 15, for example, the results extracted from the remotely sensed images of the snow period by using the NDWI and the MNDWI are shown in the figure. In this application, the water body image in snow period (November to next April) is extracted by using the NDWI, and the water body image in period without snow (May to October) is extracted by using the MNDWI, which is not limited specifically herein.

In the method of this embodiment, through judging the periods of the remotely sensed images, different water body indexes are selected for processing the remotely sensed images of different periods, which makes the calculation results more accurate.

Optionally, in the embodiment of the present application, the calculations for the lake shoreline and for the lake area based on the water body indexes can be realized through a cloud computing platform. For example, the calculations above can be performed by a GEE cloud computing platform, so as to realize the remotely sensed images processing, thereby avoiding downloading a large quantity of images, and improving calculation efficiency.

Figure 16:
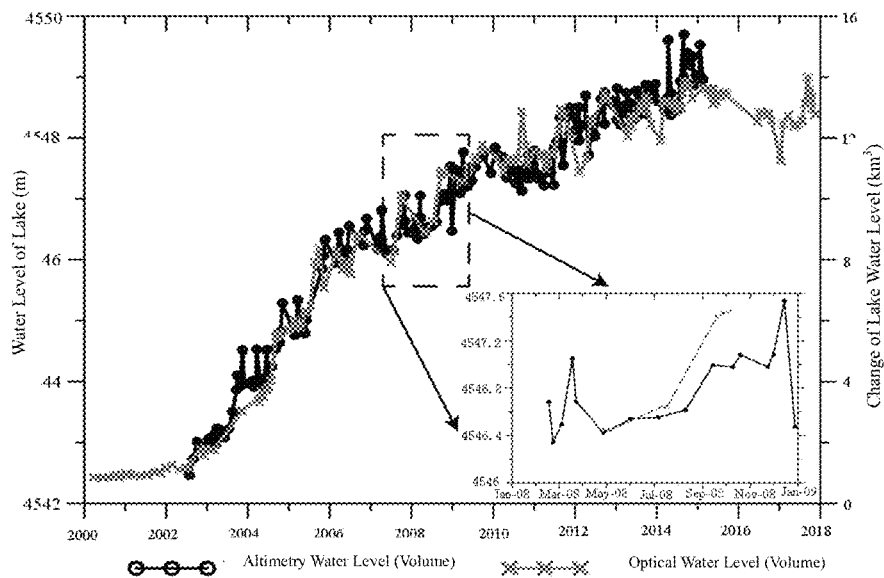
FIG. 16 is a diagram illustrating results of monitoring the water volume change of Selin Co Lake by the method of the present application.

FIG. 16 shows results of remotely sensing and monitoring the water volume change of Selin Co Lake (the second largest lake in Qinghai-Tibet plateau) by the method of the present application. Long-term monitoring of the water volume change of the lake in the remote region is realized.

In the embodiment of this application, different water body indexes are selected and used to extract the water body images, so that the extracted water body images are more accurate, and that the obtained water body areas are more accurate.

It should be understood that, although the steps in the flow charts of FIGS. 1-11 and 14 are shown sequentially with the arrows, these steps are not necessarily performed in the orders indicated by the arrows. Except that there are specific explanations, the execution of these steps is not strictly limited, and these steps may be performed in other orders. Moreover, at least some of the steps shown in FIGS. 1-11 and 14 may each include multiple sub-steps or multiple phases, and these sub-steps or phases are not necessarily performed at the same time instant but may be performed at different time instants. These sub-steps or phases are not necessarily executed sequentially, but may be performed in turns or alternately with at least some of other steps, or with at least some of the sub-steps or phases of other steps.

Figure 17:
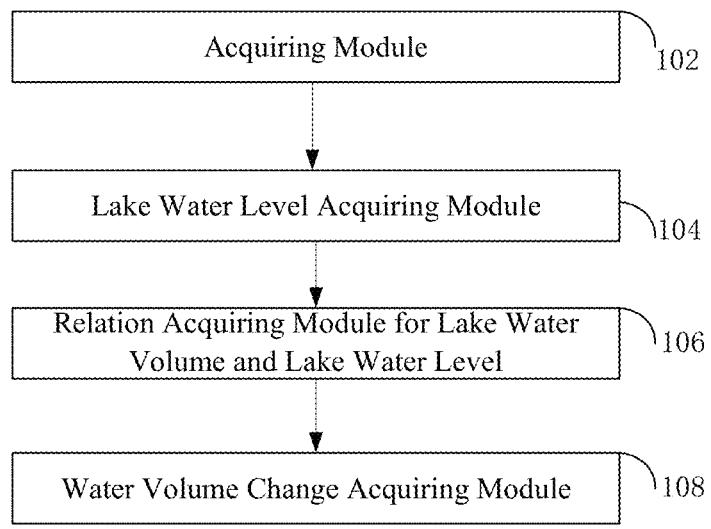
FIG. 17 is a structural block diagram illustrating an embodiment of a device for monitoring the water volume change.

In an embodiment, as shown in FIG. 17, the present application provides a device for monitoring water volume change, including an acquiring module 102, a lake water level acquiring module 104, a relation acquiring module 106 for a lake water volume and a lake water level, and a water volume change acquiring module 108.

The acquiring module 102 is configured to acquire a lake shoreline change sequence, a lake area change sequence, and a combined altimetry water level sequence.

The lake water level acquiring module 104 is configured to obtain a lake water level sequence based on the combined altimetry water level sequence and the lake shoreline change sequence.

The relation acquiring module 106 for lake water volume and lake water level is configured to calculate a first regressive relationship between the lake water volume and the lake water level based on the lake area change sequence and the lake water level sequence.

The water volume change acquiring module 108 is configured to obtain a lake water volume change sequence based on the lake water level sequence and the first regressive relationship between the lake water volume and the lake water level.

In an embodiment, the device for monitoring the water volume change further includes a receiving module, a selecting module and a judging module.

The receiving module is configured to receive altimetry water level sequences from different sources.

The selecting module is configured to select computational methods for combined altimetry water levels and for different water body indexes.

The judging module is configured to judge whether an overlapped time period between the altimetry water level sequences from different sources is greater than a first preset value, and judge whether remotely sensed images are images of a snow period.

Specific definitions of the device for monitoring the water volume change can refer to the above definitions of the method for monitoring the water volume change, and they will not be described herein repeatedly. All modules of the device for preventing tire freeze may be implemented wholly or partially by software, hardware, or a combination of software and hardware. Each of the modules above may be hardware embedded in or provided separately in a processor of a computer device, or may be in the form of software stored in a memory of a computer device, so that the processor can call and run operations of each corresponding module above.

Figure 18:
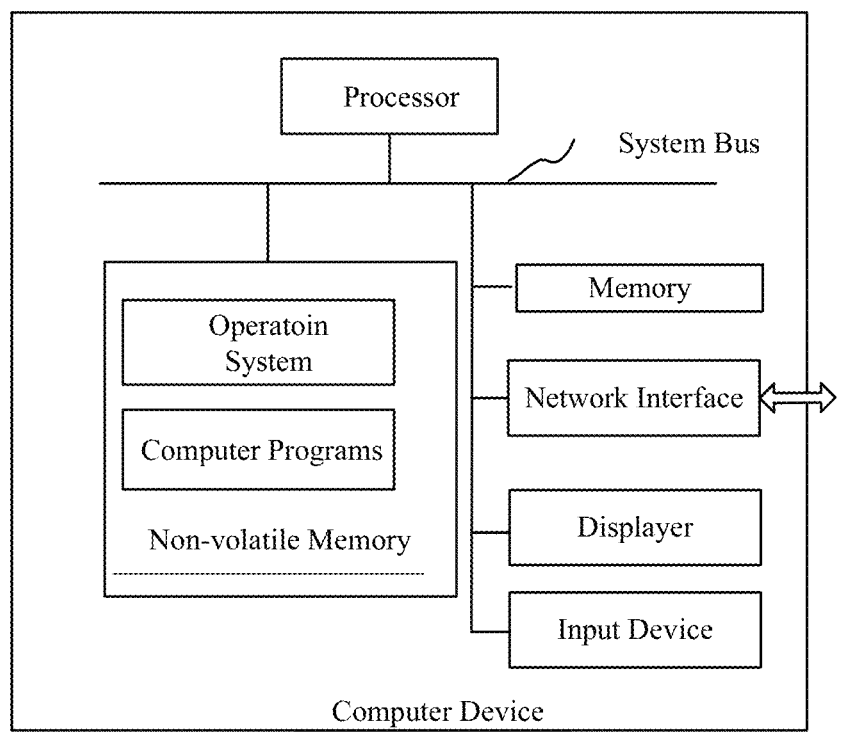
FIG. 18 is diagram illustrating an embodiment of an internal structure of a computer device.

In an embodiment, a computer device is provided. The computer device can be a server. The internal structure of the computer device is shown in FIG. 18. The computer device includes a processor, a memory, a network interface and a database, which are connected through a system bus. Wherein, the processor of the computer device is configured to provide computing and controlling capabilities. The memory of the computer device includes a non-volatile storage medium and an internal memory. The non-volatile storage medium stores an operating system, computer programs, and a database. The internal memory provides operation environments for the operating system and computer programs stored in the non-volatile storage medium. The database of the computer device is configured to store monitored data for water level change. The network interface of the computer device is configured to connect and communicate the computer device with external terminals through a network. The method for monitoring the water level change is implemented when the computer programs are executed by the processor.

It should be understood by those skilled in the art that, the structure shown in FIG. 18 is merely a block diagram of partial structure related to the schemes of the present disclosure, but not intended to limit the computer device, in which the schemes of the present disclosure are applied. The specific computer device may include more or fewer components than those shown in the figure, or have some components incorporated, or have different arrangements of components.

In an embodiment, a computer device is provided. The computer device includes a memory, a processor, and computer programs stored in the memory and executable by the processor. By executing the computer programs, the processer is capable of performing the above-described method for monitoring the water volume change.

In an embodiment, a computer readable storage medium is provided, on which computer programs are stored. By executing the computer programs, the processer is capable of performing the above-described method for monitoring the water volume change. It should be understood by the ordinary skilled in the art that, all or part of the processes in the methods of the above embodiments can be implemented through computer programs controlling corresponding hardware; the computer programs can be stored in the non-volatile computer readable storage medium; and when the computer programs are executed, they may include the processes in the methods of the above embodiments. Wherein, any memory, storage, databases or other medium described in all embodiments provided by the present invention may include non-volatile and/or volatile memory. Non-volatile memory can include Read-Only Memory (ROM), Programmable ROM (PROM), Erasable Programmable ROM (EPROM), Electrically Erasable Programmable ROM (EEPROM), or flash memory. Volatile memory may include Random Access memory (RAM) or external cache memory. Not illustrated as limitation but as explanations, RAM may be any one of Static RAM (SRAM), Dynamic RAM (DRAM), Synchronous DRAM (SDRAM), Double Data Rate SDRAM (DDR SDRAM), Enhanced SDRAM (ES-DRAM), Synchronization Link DRAM (SLDRAM), Rambus Direct RAM (RDRAM), Direct Rambus Dynamic RAM (DRDRAM), and Rambus Dynamic RAM (RDRAM).

The technical features of the above embodiments may be combined arbitrarily. For the sake of concision of the description, not all possible combinations of the technical features of the embodiments above are described. However, as long as there is no contradiction in the combinations of these technical features, the combinations should be in the scope of the disclosure of the specification.

What described above are several embodiments of the present invention, and these embodiments are specific and in details, but not intended to limit the scope of the present invention. It should be understood by the skilled in the art that various modifications and improvements can be made without departing from the concept and the scope of the present invention. Therefore, the scope of the present invention is defined by the appended claims.

What is claimed is:

1. A method for monitoring a water volume change, comprising:
acquiring a lake shoreline change sequence, a lake area change sequence, and a combined altimetry water level sequence;
obtaining a lake water level sequence based on the combined altimetry water level sequence and the lake shoreline change sequence;
calculating a first regressive relationship between the lake water volume and the lake water level based on the lake area change sequence and the lake water level sequence; and
obtaining a lake water volume change sequence based on the lake water level sequence and the first regressive relationship between the lake water volume and the lake water level.

2. The method of claim 1, wherein the obtaining the lake water level sequence based on the combined altimetry water level sequence and the lake shoreline change sequence comprises:
matching the combined altimetry water level sequence with the lake shoreline change sequence, through linear regression analysis, to obtain a regression coefficient and a determination coefficient, a time interval between the matched combined altimetry water level sequence and the matched lake shoreline change sequence being within a preset time interval value;
calculating the optical water level sequence from the lake shoreline change sequence based on the regression coefficient and the determination coefficient; and
obtaining the lake water level sequence based on the optical water level sequence and the combined altimetry water level sequence.

3. The method of claim 1, wherein the calculating a first regressive relationship between the lake water volume and the lake water level based on the lake area change sequence and the lake water level sequence comprises:
obtaining a quadratic fitting function fitting the lake area change sequence and the lake water level sequence, to obtain the second regressive relationship between the lake area and the lake water level; and
obtaining the first regressive relationship between the lake water volume and the lake water level based on the second regressive relationship between the lake area and the lake water level and through an integral operation.

4. The method of claim 1, further comprising:
receiving altimetry water level sequences from different sources;
judging whether an overlapped time period between the altimetry water level sequences from different sources is greater than a first preset value or not;
if the overlapped period between the altimetry water level sequences from different sources is larger than the first preset value, updating the altimetry water level sequences from corresponding sources by removing different system deviations, and combining the updated altimetry water level sequences, to obtain different intermediate altimetry water level sequences; respectively calculating smoothness values of the intermediate altimetry water level sequences; selecting an optimal smoothness value from the smoothness values of the intermediate altimetry water level sequences; and regarding the intermediate altimetry water level sequence having the optimal smoothness value as the combined altimetry water level sequence; and
if the overlapped period between the altimetry water level sequences from different sources is less than or equal to the first preset value, combining the altimetry water level sequences from corresponding sources by removing different system deviations, to obtain different intermediate altimetry water level sequences; obtaining a linear fitting function fitting each of the intermediate altimetry water level sequences and the lake shoreline change sequence, through linear regression analysis, to obtain a determination coefficient corresponding to each of the intermediate altimetry water level sequences; and regarding the intermediate altimetry water level sequence with a largest determination coefficient as the combined altimetry water level sequence.

5. The method of claim 4, wherein the respectively calculating smoothness values of the intermediate altimetry water level sequences, selecting the optimal smoothness value from the smoothness values of the intermediate altimetry water level sequences, and regarding the intermediate altimetry water level sequence having the optimal smoothness value as the combined altimetry water level sequence, comprise:

acquiring the smoothness value of each of the intermediate altimetry water level sequences;

sorting the smoothness values of the intermediate altimetry water level sequences by value, and regarding a minimum smoothness value as the optimal smoothness value; and regarding the intermediate altimetry water level sequence having the minimum smoothness value as the combined altimetry water level sequence.

6. The method of claim 5, wherein the acquiring the smoothness value of each of the intermediate altimetry water level sequences comprises:

acquiring a sampling moment of each altimetry water level in each intermediate altimetry water level sequence;

obtaining a weight of a current altimetry water level based on a sampling moment of the current altimetry water level and a next sampling moment of a next altimetry water level sampled at the next sampling moment;

acquiring a water level difference between the current altimetry water level and the next altimetry water level; and obtaining the smoothness value of each intermediate altimetry water level sequence based on the weight and the water level difference corresponding to each altimetry water level in the intermediate altimetry water level sequence.

7. The method of claim 1, further comprising:

receiving altimetry waves from each source;

selecting altimetry waveforms located in a lake area from the received altimetry waves in a same cycle of each source;

retracking the altimetry waveform through an improved threshold retracker (ITR) algorithm, to obtain one or more altimetry water levels corresponding to a same altimetry waveform;

screening the altimetry water levels of all altimetry waveforms in the same cycle of each source through a clustering algorithm, to obtain one altimetry water level; and obtaining a plurality of altimetry water levels in a plurality of cycles to form the altimetry water level sequence of each source.

8. The method of claim 7, wherein the retracking the altimetry waveforms through the improved threshold retracker algorithm, to obtain one or more altimetry water levels corresponding to the same altimetry waveform comprises:

separating each altimetry waveform into sub-waveforms by identifying a suddenly-changed position of an echo power in the waveform, to obtain the sub-waveforms and a number thereof; and calculating a correction for each sub-waveform through the ITR algorithm, and correcting the waveform according to the correction, to obtain one or more altimetry water levels corresponding to the same altimetry waveform.

9. The method of claim 8, wherein the separating each altimetry waveform into sub-waveforms by identifying the suddenly-changed position of the echo power in the waveform, to obtain the sub-waveforms and the number thereof comprises:

obtaining a plurality of first echo power differences, a plurality of second echo power differences, a first mean square error, a second mean square error, and a first reference value;

among the second echo power differences corresponding to all sampling points of the altimetry waveform, if the second echo power differences in a continuous sub-sequence of the altimetry waveform are all greater than the first reference value, and a quantity of the second echo power differences in the continuous sub-sequence is equal to or larger than a first preset number, regarding echo powers of the continuous sub-sequence as a sub-sequence, and recording a position of a potential sub-waveform by recording an initial sequence number of the echo power and a length of the continuous sub-sequence;

if, in each sub-sequence, the number of the sampling points having the first echo power difference less than or equal to the first mean square error is larger than or equal to a second preset number, determining that the sub-sequence is not a confirmed sub-waveform; and if, in each sub-sequence, the number of the sampling points having the first echo power difference less than or equal to the first mean square error is less than the second preset number, determining that the sub-sequence is a confirmed sub-waveform.

10. The method of claim 9, wherein the obtaining the plurality of first echo power differences, the plurality of second echo power differences, the first mean square error, the second mean square error, and the first reference value comprises:

acquiring echo powers of continuous three sampling points which are a current sampling point i, a next sampling point i+1 after the current sampling point, and a third sampling point i+2 directly after the next sampling point;

obtaining the first echo power difference $D1_i$ between the echo power $P_i$ of the current sampling point i and the echo power $P_{i+1}$ corresponding to the next sampling point i+1;

obtaining the second echo power difference $D2_i$ between the echo power $P_i$ of the current sampling point i and the echo power $P_{i+2}$ of the third sampling point;

obtaining the first mean square error S1 based on the first echo power differences D1 corresponding to all sampling points;

obtaining the second mean square error S2 based on the second echo power differences D2 corresponding to all sampling points; and calculating the first reference value based on a first preset multiplier and the second mean square error.

11. The method of claim 8, wherein the calculating the correction for each sub-waveform through the ITR algorithm, and correcting the waveform according to the correction, to obtain one or more altimetry water levels corresponding to the same altimetry waveform, comprise:

calculating a waveform amplitude of each sub-waveform;

calculating an average value of the echo powers of a first N sampling points corresponding to each sub-waveform;

taking a half of a sum of the waveform amplitude of the sub-waveform and the average value of the echo powers of the first N sampling points corresponding to the sub-waveform as a threshold value, determining a midpoint of a leading edge of each sub-waveform through a linear interpolation method, and calculating the correction corresponding to the sub-waveform; and correcting each altimetry waveform according to the correction, to obtain one or more altimetry water levels corresponding to one altimetry waveform in each cycle.

12. The method of claim 7, wherein the screening the altimetry water levels of all altimetry waveforms in the same cycle of each source through the clustering algorithm, to obtain one altimetry water level comprises:
- dividing a water level distribution scope of the altimetry water levels of the altimetry waveforms in each cycle into a plurality of equal water level ranges; and
- counting a number of the altimetry water levels in each water level range; selecting a water level range with a largest aggregation degree of the altimetry water levels; averaging the altimetry water levels in the water level range with the largest aggregation degree to acquire a clustering center, and the clustering center being an altimetry water level corresponding to one cycle.

13. The method of claim 12, further comprising:
- judging whether a number of the altimetry water levels in the water level range with the largest aggregation degree in one cycle is greater than or equal to a second preset value;
- if the number of the altimetry water levels in the water level range with the largest aggregation degree in one cycle is larger than or equal to the second preset value, determining a quality rank of the clustering center to be a first rank;
- if the number of the altimetry water levels in the water level range with the largest aggregation degree in one cycle is less than the second preset value, judging whether the number of the altimetry water levels in the water level range with the largest aggregation degree in one cycle is greater than or equal to a third preset value;
- if the number of the altimetry water levels in the water level range with the largest aggregation degree in one cycle is less than the second preset value, and greater than or equal to the third preset value, determining the quality rank of the clustering center to be a second rank; and
- if the number of the altimetry water levels in the water level range with the largest aggregation degree in one cycle is less than the third preset value, determining the quality rank of the clustering center to be a third rank;
- wherein the second preset value is greater than the third preset value.

14. The method of claim 13, further comprising:
- when an altimetry water level is in a water level range having a clustering center in the third quality rank, and a difference between the altimetry water level and an adjacent altimetry water level thereof is larger than or equal to a preset threshold value, the altimetry water level is excluded.

15. The method of claim 1, further comprising:
receiving remotely sensed images;
receiving an area selection command for selecting a research area;
selecting different water body indexes for remotely sensed images in different time periods, and extracting water body images based on water body indexes; and
selecting a threshold value satisfying a maximum inter-class variance through a Maximal Inter-Class Variance Algorithm, binarizing each of the extracted water body images, and counting a number of target pixels, to obtain a water body area, which is used for characterizing the lake shoreline change sequence and the lake area change sequence.

16. The method of claim 15, wherein the selecting different water body indexes for the remotely sensed images in different time periods, and the extracting water body images based on the water body indexes comprise:
- judging whether a remotely sensed image is an image of a snow period;
- if the remotely sensed image is the image of the snow period, selecting a normalized difference water index to extract a water body image; and
- if the remotely sensed image is not the image of the snow period, selecting a modified normalized difference water index to extract a water body image.

17. A computer device, comprising a memory, a processor, and computer programs stored in the memory and executable by the processor; the computer programs, when executed by the processor, causes the processer to perform the method of claim 1.

18. A computer readable storage medium, having computer programs stored thereon, the computer programs, when executed by a processor, causes the processor to perform the method of claim 1.

* * * * *